United States Patent
Hirokawa et al.

(10) Patent No.: US 10,696,076 B2
(45) Date of Patent: Jun. 30, 2020

(54) INK JET RECORDING APPARATUS AND INK JET RECORDING METHOD

(71) Applicant: CANON KABUSHIKI KAISHA, Tokyo (JP)

(72) Inventors: Ryosuke Hirokawa, Kawasaki (JP); Toshimori Miyakoshi, Yokohama (JP); Hiroaki Motooka, Kawasaki (JP); Ryohei Goto, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/023,312

(22) Filed: Jun. 29, 2018

(65) Prior Publication Data

US 2018/0319190 A1 Nov. 8, 2018

Related U.S. Application Data

(63) Continuation of application No. PCT/JP2016/005241, filed on Dec. 28, 2016.

(30) Foreign Application Priority Data

Jan. 5, 2016 (JP) .................................. 2016-000747
May 30, 2016 (JP) .................................. 2016-107949

(51) Int. Cl.
*B41M 5/00* (2006.01)
*B41J 2/01* (2006.01)
(Continued)

(52) U.S. Cl.
CPC .............. *B41M 5/0017* (2013.01); *B41J 2/01* (2013.01); *B41J 11/0015* (2013.01); *B41M 7/00* (2013.01);
(Continued)

(58) Field of Classification Search
CPC ............ B41M 5/0017; B41M 5/00; B41J 2/01
See application file for complete search history.

(56) References Cited

U.S. PATENT DOCUMENTS 3,962,153 A 6/1976 Gore
5,841,456 A 11/1998 Takai et al.
(Continued)

FOREIGN PATENT DOCUMENTS

CN 1990241 A 7/2007
CN 101332708 A 12/2008
(Continued)

OTHER PUBLICATIONS

Google translation of JP 2009-061644, published on Mar. 2009. (Year: 2009).*

(Continued)

*Primary Examiner* — Huan H Tran
(74) *Attorney, Agent, or Firm* — Venable LLP

(57) ABSTRACT

An ink jet recording method is disclosed where, when a liquid including water is absorbed and removed from an image including an aqueous liquid component and a coloring material, by use of a water repellent porous body, a contact surface of the porous body with the image is treated with a wetting liquid whose contact angle to the contact surface is less than 90°, and thereafter absorption and removal of the aqueous liquid component from the image by the porous body are performed.

27 Claims, 8 Drawing Sheets

(51) Int. Cl.
  *B41J 11/00* (2006.01)
  *B41M 7/00* (2006.01)
  *B41M 1/06* (2006.01)
  *B41M 5/025* (2006.01)
  *B41M 5/03* (2006.01)

(52) U.S. Cl.
  CPC .......... *B41J 2002/012* (2013.01); *B41M 1/06* (2013.01); *B41M 5/0256* (2013.01); *B41M 5/03* (2013.01)

(56) References Cited

U.S. PATENT DOCUMENTS

| | | | |
|---|---|---|---|
| 6,916,081 B2 | 7/2005 | Nakashima | |
| 7,129,284 B2 | 10/2006 | Ma et al. | |
| 7,422,318 B2 | 9/2008 | Kadomatsu et al. | |
| 7,481,526 B2 | 1/2009 | Inoue | |
| 7,497,564 B2 | 3/2009 | Yui | |
| 7,556,342 B2 | 7/2009 | Hamano | |
| 7,594,722 B2 * | 9/2009 | Kadomatsu | B41J 2/2114 347/105 |
| 7,766,457 B2 | 8/2010 | Chen | |
| 7,845,760 B2 * | 12/2010 | Hirakawa | B41J 2/0057 347/30 |
| 7,926,933 B2 | 4/2011 | Taniuchi et al. | |
| 8,226,225 B2 * | 7/2012 | Yamanobe | B41J 2/0057 347/103 |
| 8,246,158 B2 | 8/2012 | Ageishi et al. | |
| 8,857,962 B2 | 10/2014 | Goto et al. | |
| 9,102,137 B2 | 8/2015 | Koitabashi et al. | |
| 9,616,653 B2 | 4/2017 | Liu | |
| 9,796,171 B2 | 10/2017 | Liu | |
| 9,821,584 B2 | 11/2017 | Noguchi et al. | |
| 10,071,567 B2 | 9/2018 | Hirokawa et al. | |
| 10,384,470 B2 * | 8/2019 | Yamane | B41J 2/1714 |
| 2006/0055755 A1 | 3/2006 | Yui | |
| 2006/0061642 A1 | 3/2006 | Ueki | |
| 2006/0170752 A1 | 8/2006 | Kadomatsu et al. | |
| 2006/0221166 A1 | 10/2006 | Inoue | |
| 2007/0229586 A1 | 10/2007 | Hirakawa | |
| 2008/0055356 A1 * | 3/2008 | Yamanobe | B41J 2/0057 347/21 |
| 2008/0236480 A1 * | 10/2008 | Furukawa | C23C 26/02 118/50 |
| 2009/0079784 A1 | 3/2009 | Chiwata et al. | |
| 2011/0069109 A1 | 3/2011 | Tojo | |
| 2015/0306539 A1 | 10/2015 | Yamato | |
| 2017/0217217 A1 | 8/2017 | Miyakoshi et al. | |
| 2017/0232729 A1 * | 8/2017 | Hirokawa | B41J 2/0057 347/103 |
| 2018/0319179 A1 * | 11/2018 | Yamane | B41J 2/1714 |
| 2018/0319189 A1 * | 11/2018 | Ohnishi | B41J 2/2103 |
| 2018/0326755 A1 * | 11/2018 | Ohnishi | B41J 11/0015 |

FOREIGN PATENT DOCUMENTS

| | | |
|---|---|---|
| CN | 100546832 C | 10/2009 |
| CN | 101607468 A | 12/2009 |
| CN | 103660656 A | 3/2014 |
| EP | 2 123 459 A2 | 11/2009 |
| EP | 2 777 941 A1 | 9/2014 |
| JP | S56-45773 B2 | 10/1981 |
| JP | 2000-103157 A | 4/2000 |
| JP | 2001-171143 A | 6/2001 |
| JP | 2001-179959 A | 7/2001 |
| JP | 2004-043047 A | 2/2004 |
| JP | 2004-181955 A | 7/2004 |
| JP | 2006-082428 A | 3/2006 |
| JP | 2006-088486 A | 4/2006 |
| JP | 2006-102981 A | 4/2006 |
| JP | 2006-205677 A | 8/2006 |
| JP | 2006-264080 A | 10/2006 |
| JP | 2007-268974 A | 10/2007 |
| JP | 2007-268975 A | 10/2007 |
| JP | 4016559 B2 | 12/2007 |
| JP | 2008-055852 A | 3/2008 |
| JP | 2008-087283 A | 4/2008 |
| JP | 2008-213333 A | 9/2008 |
| JP | 2008-246787 A | 10/2008 |
| JP | 2009-000915 A | 1/2009 |
| JP | 2009-000916 A | 1/2009 |
| JP | 2009-045851 A | 3/2009 |
| JP | 2009-061644 A | 3/2009 |
| JP | 2009-072927 A | 4/2009 |
| JP | 2009-086348 A | 4/2009 |
| JP | 2009-159116 A | 7/2009 |
| JP | 2009-166387 A | 7/2009 |
| JP | 2009-214439 A | 9/2009 |
| JP | 2009-226852 A | 10/2009 |
| JP | 2009-234219 A | 10/2009 |
| JP | 2010-201796 A | 9/2010 |
| JP | 2011-063001 A | 3/2011 |
| JP | 2011-245865 A | 12/2011 |
| JP | 2012-116617 A | 6/2012 |
| JP | 2012-183798 A | 9/2012 |
| JP | 2013-010267 A | 1/2013 |
| JP | 2014-193599 A | 10/2014 |
| JP | 2015-016687 A | 1/2015 |
| JP | 2015-096562 A | 5/2015 |
| JP | 2015-098097 A | 5/2015 |
| JP | 2015-145117 A | 8/2015 |
| JP | 2015-150789 A | 8/2015 |
| JP | 2015-208881 A | 11/2015 |
| JP | 2016-120625 A | 7/2016 |
| WO | 2015/034027 A1 | 3/2015 |
| WO | 2017119040 A | 7/2017 |
| WO | 2018/105215 A1 | 6/2018 |

OTHER PUBLICATIONS

Google translation of JP 2009-214439, published on Sep. 2009. (Year: 2009).*
Sep. 17, 2018 Singapore Search Report and Written Opinion in Patent Appln. No. 11201805829P.
Jul. 19, 2018 International Preliminary Report on Patentability in International Application PCT/JP2016/005241.
Search Report dated Mar. 7, 2017, in International Application No. PCT/JP2016/005241.
May 24, 2019 Chinese Official Action in Chinese Patent Appln. No. 201680078084.8.
Mar. 7, 2017 International Search Report in international appliation PCT/JP2016/005249 corresponding to co-pending U.S. Appl. No. 16/022,169.
Mar. 7, 2017 International Search Report in international application PCT/JP2016/005242 corresponding to co-pending U.S. Appl. No. 16/023,559.
Mar. 14, 2017 International Search Report in international application PCT/JP2016/005250 corresponding to co-pending U.S. Appl. No. 16/026,202.
Mar. 21, 2017 International Search Report in international application PCT/JP2016/005247 corresponding to co-pending U.S. Appl. No. 16/022,143.
Mar. 28, 2017 International Search Report in international application PCT/JP2016/005246 corresponding to co-pending U.S. Appl. No. 16/022,118.
Mar. 28, 2017 International Search Report in international application PCT/JP2016/005248 corresponding to co-pending U.S. Appl. No. 16/022,223.
Mar. 28, 2017 International Search Report in international application PCT/JP2016/005244 corresponding to co-pending U.S. Appl. No. 16/026,194.
Apr. 4, 2017 International Search Report in international application PCT/JP2016/005251 corresponding to co-pending U.S. Appl. No. 16/022,189.
Apr. 4, 2017 International Search Report in international application PCT/JP2017/002666 corresponding to co-pending U.S. Appl. No. 16/042,200.
Jul. 11, 2019 extended European Search Report in European Patent Appln. No. 16883554.4.

(56) References Cited

OTHER PUBLICATIONS

Jul. 12, 2019 extended European Search Report in European Patent Appln. No. 16883550.2.
Jul. 12, 2019 extended European Search Report in European Patent Appln. No. 16883551.0.
Jul. 12, 2019 extended European Search Report in European Patent Appln. No. 16883553.6.
Jul. 23, 2019 extended European Search Report in European Patent Appln. No. 16883549.4.
Jul. 23, 2019 extended European Search Report in European Patent Appln. No. 16883546.0.
Apr. 25, 2019 Chinese Official Action in Chinese Patent Appln. No. 201680078027.X.
Apr. 25, 2019 Chinese Official Action in Chinese Patent Appln. No. 201680078100.3.
Apr. 28, 2019 Chinese Official Action in Chinese Patent Appln. No. 201680078028.4.
Notice of Allowance in Chinese Patent Application No. 201680078027.X, dated Sep. 27, 2019.
Office Action in Korean Patent Application No. 10-2018-7021597, dated Dec. 4, 2019.
Brazilian Office Action issued in corresponding Brazilian Application No. BR112018013641-7 dated May 5, 2020.

* cited by examiner

INK JET RECORDING APPARATUS AND INK JET RECORDING METHOD

CROSS-REFERENCE TO RELATED APPLICATIONS

This application is a Continuation of International Patent Application No. PCT/JP2016/005241, filed Dec. 28, 2016, which claims the benefit of Japanese Patent Application Nos. 2016-000747, filed Jan. 5, 2016, and 2016-107949, filed May 30, 2016, all of which are hereby incorporated by reference herein in their entirety.

BACKGROUND OF THE INVENTION

Field of the Invention

The present invention relates to an ink jet recording apparatus and an ink jet recording method.

Description of the Related Art

In an ink jet recording system, an image is formed by directly or indirectly applying a liquid composition (ink) including a coloring material to a recording medium such as paper. Here, curling and cockling may be caused due to excessive absorption of a liquid component in the ink by the recording medium.

In order to then rapidly remove a liquid component in an ink, a method including drying a recording medium by use of any measure such as hot air or infrared light, and a method including forming an image on a transfer body, thereafter drying a liquid component contained in the image on the transfer body by heat energy or the like and thereafter transferring the image to a recording medium such as paper are proposed.

Furthermore, as a procedure for the removal of a liquid component contained in an image on a transfer body, a method has been proposed which includes allowing a roller-shaped porous body to be in contact with an ink image, to absorb and remove a liquid component from the ink image, without any heat energy (Japanese Patent Application Laid-Open No. 2009-45851). A method has also been proposed which includes allowing a belt-shaped polymer absorber to be in contact with an ink image, to absorb and remove a liquid component from the ink image (Japanese Patent Application Laid-Open No. 2001-179959).

When a porous body is allowed to be in contact with an image to remove a liquid component from the image, it is necessary to not only efficiently remove the liquid component from the image, but also suppress reduction of the image quality due to attachment of a coloring material constituting the image to the surface of the porous body. If the liquid component cannot be efficiently removed from the image in contact of the porous body with the image, drifting of a part of a liquid, a coloring material and a solid content or the like other than the coloring material in the ink towards the rear end of the image, so-called "image disturbance" is easily caused.

In Japanese Patent Application Laid-Open No. 2009-45851, a metallic porous body (material obtained by sintering an alumina particle) is utilized as an absorbing material of the roller-shaped porous body of a solvent removal unit for removal of a solvent of the ink image. Japanese Patent Application Laid-Open No. 2009-45851, however, does not disclose any configuration of the porous body for simultaneously performing suppression of attachment of the coloring material to the absorbing material and efficient removal of a liquid (solvent) component from the image.

The ink absorber used in Japanese Patent Application Laid-Open No. 2001-179959 has a liquid solvent absorber that absorbs a liquid solvent of an ink, and a liquid release member that covers at least a part of the surface of the liquid solvent absorber, that has releasability with a colorant of the ink and that penetrates through the liquid solvent of the ink. While attachment of a colorant of the ink to the liquid solvent absorber is suppressed by the release member, however, permeability of a liquid solvent component of the ink in the release member is not sufficient depending on the material of the release member, and the absorption and removal efficiency of the liquid solvent component from the image cannot be enhanced in some cases.

An object of the present invention is to provide an ink jet recording apparatus and an ink jet recording method in which a porous body can be allowed to be in contact with an image to thereby remove a liquid component from the image and also suppress attachment of a coloring material constituting the image to the porous body.

SUMMARY OF THE INVENTION

The ink jet recording method according to the present invention is an ink jet recording method including:
an image forming step of forming a first image comprising an aqueous liquid component and a coloring material by applying an ink including the coloring material and a reaction liquid that viscously thickens the ink, onto an ink receiving medium; and
a liquid absorbing step of absorbing at least a part of the aqueous liquid component from the first image by bringing a first surface having water repellency of a porous body of a liquid absorbing member into contact with the first image on the ink receiving medium; wherein
the method further includes a wetting treatment step of performing a wetting treatment by applying a wetting liquid whose contact angle to the first surface is less than 90°, to the first surface, and
the liquid absorbing step is to bring the first surface wetted in the wetting treatment step into contact with the first image.

In addition, the ink jet recording method according to the present invention is an ink jet recording method including:
an image forming step of forming a first image comprising an aqueous liquid component and a coloring material by applying an ink including the coloring material and a reaction liquid that viscously thickens the ink onto an ink receiving medium; and
a liquid absorbing step of concentrating an ink constituting the first image by bringing a first surface of a porous body having water repellency of a liquid absorbing member into contact with the first image on the ink receiving medium, wherein
the method further includes a wetting treatment step of performing a wetting treatment by applying a wetting liquid whose contact angle to the first surface is less than 90°, to the first surface, and
the liquid absorbing step is to bring the first surface wetted in the wetting treatment step into contact with the first image.

The ink jet recording apparatus according to the present invention is an ink jet recording apparatus including:
an image forming unit that forms a first image comprising an aqueous liquid component and a coloring material by applying an ink including the coloring material and a reaction liquid that viscously thickens the ink onto an ink receiving medium; and a liquid absorbing member including a porous body having a first surface having water repellency, and absorbing at least a part of the aqueous liquid component from the first image by bringing the first surface into contact with the first image on the ink receiving medium; wherein
the apparatus further includes a wetting treatment unit that performs a wetting treatment by applying a wetting liquid whose contact angle to the first surface is less than 90°, to the first surface.

In addition, the ink jet recording apparatus according to the present invention is an ink jet recording apparatus including:
an image forming unit that forms a first image comprising an aqueous liquid component and a coloring material by applying an ink including the coloring material and a reaction liquid that viscously thickens the ink onto an ink receiving medium; and
a liquid absorbing member including a porous body having a first surface having water repellency, and concentrating an ink constituting the first image by bringing the first surface into contact with the first image on the ink receiving medium, wherein
the apparatus further includes a wetting treatment unit that performs a wetting treatment by applying a wetting liquid whose contact angle to the first surface is less than 90°, to the first surface.

Further features of the present invention will become apparent from the following description of exemplary embodiments with reference to the attached drawings.

DESCRIPTION OF THE EMBODIMENTS

Figure 1:
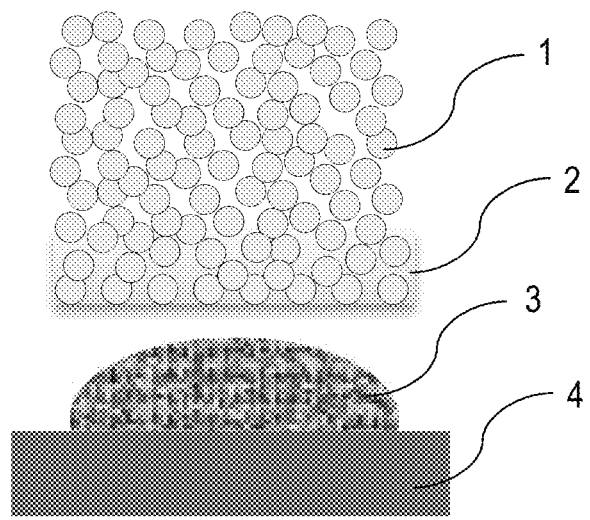
FIG. 1 is a schematic view illustrating the state before a first surface of a porous body wetted by a wetting liquid is allowed to be in contact with a first image.

The ink jet recording method according to the present invention includes an image forming step of forming a first image including an aqueous liquid component and a coloring material, namely, an image to be treated, which is an object of a liquid absorbing treatment, on an ink receiving medium, and a liquid absorbing step of allowing a porous body of a liquid absorbing member to be in contact with the first image, to thereby absorb at least a part of the aqueous liquid component from the first image. Application of an ink including a coloring material to the receiving medium is performed according an ink jet method.

The liquid absorbing member includes a water repellent porous body having absorbability of the aqueous liquid component. The porous body includes a first surface as a contact surface to be in contact with the first image. At least a part of the aqueous liquid component included in the first image is absorbed by the porous body via the first surface of the porous body.

The inkjet recording method according to the present invention further includes a wetting treatment step of applying a wetting liquid whose contact angle to the first surface is less than 90°, to the first surface of the porous body, to perform a wetting treatment. A liquid absorbing step of allowing the first surface wetted in the wetting treatment step to be in contact with the first image, to thereby absorb the aqueous liquid component from the first image via the first surface of the porous body to which the wetting liquid is applied is then performed.

The wetting treatment that applies the wetting liquid to the first surface of the porous body can be performed by at least one of the following methods.

(1) A method including receiving the wetting liquid in a receiving unit and feeding the wetting liquid from the receiving unit to the first surface of the porous body, to perform the wetting treatment of the first surface of the porous body.

(2) A method including allowing the aqueous liquid component included in the first image to have a function as the wetting liquid, and feeding the wetting liquid from the first image to the first surface of the porous body in contact of the first surface of the porous body with the first image, to thereby perform the wetting treatment of the first surface of the porous body.

In addition, the image forming step can include a step of applying the reaction liquid to the ink receiving medium and a step of applying the ink to the ink receiving medium. Here, a region to which the reaction liquid is applied and a region to which the ink is applied are at least partially overlapped on the ink receiving medium. That is, the reaction liquid can be allowed to be in contact with the ink on the ink receiving medium to form the first image. In addition, the order of the step of applying the reaction liquid to the ink receiving medium and the step of applying the ink to the ink receiving medium is not particularly limited, and the image forming step can include the step of applying the reaction liquid to the ink receiving medium and the step of applying the ink to the ink receiving medium in this order from the viewpoint of an increase in the image quality of an image. That is, the image forming step can include the step of applying the reaction liquid to the ink receiving medium and a step of applying the ink to the ink receiving medium so as to make at least partially overlapping with the region to which the reaction liquid is applied, in this order.

The inkjet recording apparatus for use in the inkjet recording method according to the present invention includes at least an image forming unit that forms a first image including an aqueous liquid component and a coloring material on an ink receiving medium, and a liquid absorbing member including a first surface having water repellency, and including a porous body where the first surface is allowed to be in contact with the first image, to thereby absorb at least a part of the aqueous liquid component from the first image. In addition, the image forming unit includes a reaction liquid applying unit that applies the reaction liquid onto the ink receiving medium, and an ink jet recording unit that applies an ink including a coloring material, onto the ink receiving medium.

The ink jet recording apparatus further includes a wetting treatment unit that applies a wetting liquid whose contact angle to the first surface of the porous body is less than 90°, to the first surface of the porous body, to perform a wetting treatment. As the configuration of the wetting treatment unit, at least one of the following configurations can be used.
(A) A configuration including a receiving unit that receives the wetting liquid, and a wetting liquid applying unit that feeds the wetting liquid from the receiving unit to the first surface of the porous body.
(B) A configuration where a region on which the first image is formed on the ink receiving medium so that the aqueous liquid component included in the first image is allowed to have a function as the wetting liquid and the wetting liquid is fed from the first image to the first surface of the porous body in contact of the first surface of the porous body with the first image, to thereby perform the wetting treatment of the first surface of the porous body, doubles as the wetting treatment unit.

The porous body of the liquid absorbing member is allowed to be in contact with the first image including the aqueous liquid component and the coloring material on the ink receiving medium, to thereby remove at least a part of the aqueous liquid component from the first image. As a result, curling and cockling due to excessive absorption of the aqueous liquid component in the first image by a recording medium such as paper are suppressed.

In the present invention, the liquid absorbing member that absorbs at least a part of the aqueous liquid component from the first image including the aqueous liquid component and the coloring material is needed to have releasability to the coloring material (namely, to be low in affinity for the coloring material). Therefore, a porous body having water repellent first surface is used as the porous body. As a result, when the first surface of the porous body is allowed to be in contact with the first image to perform a liquid absorbing treatment, and thereafter the first surface is peeled from the image to provide a second image where the content of the aqueous liquid component is reduced, attachment of the coloring material to the porous body can be suppressed. The detail of a mechanism where the water repellent porous body can suppress attachment of the coloring material is unclear, but the present inventors presume as follows. One cause for easiness of attachment of the coloring material to the porous body is considered to be a relationship between the surface free energy of the porous body and the surface free energy of the coloring material (or an aggregate constituted by the coloring material, resin and the like). As the surface free energies of such two substances are closer, the two substances are more easily attached. In addition, a substance having water repellency is lower in surface free energy than a substance having hydrophilicity. Therefore, it is presumed that the water repellent porous body is used to thereby increase the difference in surface free energy between the porous body and the coloring material, thereby enabling attachment of the coloring material to the porous body to be suppressed.

Furthermore, the first surface of the porous body is allowed to be in contact with the first image in the state of being treated with the wetting liquid, thereby allowing a region impregnated with the wetting liquid to have favorable wettability to the aqueous liquid component included in the first image even in the case where the first surface of the porous body has water repellency. As a result, the aqueous liquid component of the first image can be absorbed in the water repellent porous body via the region impregnated with the wetting liquid, enhanced in wettability to the aqueous liquid component. Therefore, an efficient liquid absorbing treatment can be performed in the water repellent porous body.

The phenomenon where the aqueous liquid component of the first image is absorbed in the water repellent porous body is described in more detail with reference to the drawings. FIG. 1 is a schematic view illustrating the state before the first surface of the porous body wetted by the wetting liquid is allowed to be in contact with the first image. In addition, FIG. 2 is a schematic view illustrating the state during the first surface of the porous body wetted by the wetting liquid is allowed to be in contact with the first image.

Figure 2:
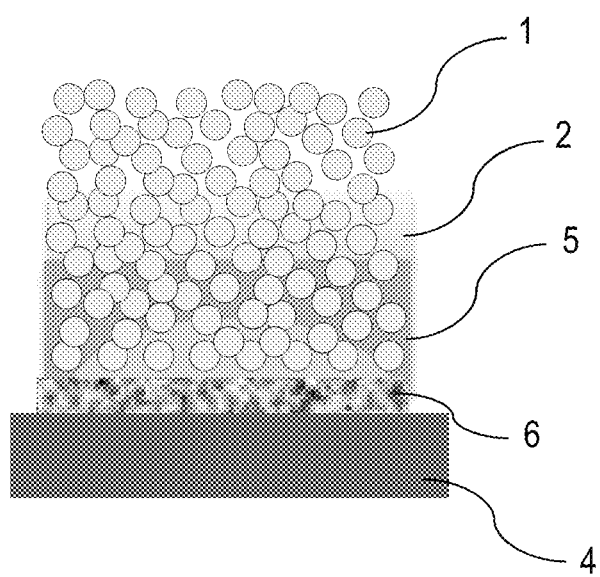
FIG. 2 is a schematic view illustrating the state during the first surface of a porous body wetted by a wetting liquid is allowed to be in contact with the first image.

In FIGS. 1 and 2, reference numeral 1 represents a water repellent porous body, reference numeral 2 represents a wetting liquid, reference numeral 3 represents a first image, reference numeral 4 represents an ink receiving medium, reference numeral 5 represents an aqueous liquid component and reference numeral 6 represents a second image. As described in FIG. 1, the wetting liquid 2 is held on a first surface of the porous body 1, the surface being a surface to be in contact with the first image 3. The wetting liquid 2 can wet the first surface that is water repellent, because the contact angle of the porous body 1 to the first surface is less than 90°.

As described in FIG. 2, when the first surface of the porous body 1, which is subjected to a wetting treatment with the wetting liquid 2 and which has water repellency, is allowed to be in contact with the first image 3, the aqueous liquid component 5 can be absorbed from the first image 3 to the porous body 1, and a second image from which the aqueous liquid component is removed can be obtained.

While the detail of such a phenomenon is unclear, the present inventors presume as follows. Even if the porous body 1 is allowed to be in contact with the first image 3 in the state where the wetting liquid 2 is not subjected to any wetting treatment, the first surface of the porous body is water repellent and therefore the aqueous liquid component is difficult to absorb from the first image 3 to the porous body 1. On the other hand, it is considered that the first surface of the porous body 1 is wetted by the wetting liquid 2, thereby enabling the water repellent porous body to absorb the aqueous liquid component in the first image via the wetting liquid, as in the present invention.

Thus, a porous body can have a first surface having water repellency to thereby suppress attachment of a coloring material from an image and also a wetting liquid can be applied to the first surface to thereby efficiently absorb an aqueous liquid component from a first image.

Herein, the porous body having water repellency in the present invention means a porous body where the contact angle of water is 90° or more. That is, the contact angle of water to the contact surface (first surface) of the porous body having water repellency with the first image is also 90° or more.

In the ink jet recording apparatus of the present invention, the image forming unit is not particularly limited as long as the image forming unit can apply an ink including a coloring material and a reaction liquid that viscously thickens the ink, onto an ink receiving medium, to thereby form a first image including an aqueous liquid component and the coloring material. The image forming unit can have 1) an apparatus constituting a reaction liquid applying unit that applies the reaction liquid onto the ink receiving medium and 2) an apparatus constituting an ink applying unit that applies the ink including the aqueous liquid medium and the coloring material onto the ink receiving medium.

Herein, the first image means an ink image before liquid removal, before subjecting to a liquid absorbing treatment, and the second image means an ink image after liquid removal, in which a liquid absorbing treatment is performed to reduce the content of the aqueous liquid component. The first image is formed by applying the reaction liquid and the ink to the ink receiving medium so as to have a region where the reaction liquid and the ink are at least overlapped. The reaction liquid enhances fittability of the coloring material applied together with the ink to the ink receiving medium. Such an enhancement in fittability of the coloring material means that the initial state where the ink applied to the ink receiving medium has fluidity is turned to the state where the ink by itself or the coloring material in the ink is lowered in fluidity due to the action of the reaction liquid and thus hardly flows and is solidified as compared with the initial state. Such an enhancement can also be expressed as viscously thickening of the ink. The mechanism is described below.

The first image is formed with including a mixture of the reaction liquid and the ink. The ink includes an aqueous liquid medium including water, and, if necessary, the reaction liquid may also include an aqueous liquid medium including water. A first image obtained from such a liquid composition includes an aqueous liquid component including water fed from such an aqueous liquid medium, together with the coloring material.

In general, the ink is a coloring material-containing ink, and a device that applies the ink onto the ink receiving medium is an inkjet recording device. The reaction liquid can also include a component that chemically or physically acts with the ink to viscously thicken the mixture of the reaction liquid and the ink as compared with each of the reaction liquid and the ink, resulting in an enhancement in fittability of the coloring material. The reaction liquid can include an aqueous liquid medium. The aqueous liquid medium includes at least water, and includes, if necessary, a water-soluble organic solvent and various additives.

At least one of the reaction liquid and the ink, when water is a first liquid, may include a second liquid other than the first liquid. While volatility of the second liquid may be high or low, the second liquid can be a liquid higher in volatility than the first liquid.

Hereinafter, one embodiment of the present invention is described. Hereinafter, a "reaction liquid applying device" is used as the reaction liquid applying unit and an "ink applying device" is used as the ink applying unit. Furthermore, hereinafter, a treatment that wets the porous body with the wetting liquid in advance is described as a pretreatment to the porous body for use in the liquid absorbing member.

<Reaction Liquid Applying Device>

The reaction liquid applying device may be any device that can apply the reaction liquid onto the ink receiving medium, and any of various devices conventionally known can be appropriately used. Specific examples include a gravure offset roller, an ink jet head, a die-coating device (die coater) and a blade coating device (blade coater). Application of the reaction liquid by the reaction liquid applying device may be performed before application of the ink or after application of the ink as long as the reaction liquid can be mixed (react) with the ink on the ink receiving medium. The reaction liquid can be applied before application of the ink. The reaction liquid can be applied before application of the ink, thereby suppressing bleeding where the ink adjacently applied is mixed and/or beading where the ink previously landed is pulled towards the ink subsequently landed, in recording of an image by an ink jet system.

<Reaction Liquid>

The reaction liquid contains a component for increasing the viscosity of the ink (ink viscosity-increasing component). An increase in the viscosity of the ink means that the coloring material, resin and the like which are components constituting the ink are allowed to be in contact with the ink viscosity-increasing component and thus chemically react therewith or physically adsorb thereto, thereby allowing an increase in the ink viscosity to be observed. Such an increase in the ink viscosity encompasses not only a case where an increase in the ink viscosity is observed, but also a local increase in the viscosity due to aggregation of a part of the components constituting the ink, such as coloring material and resin.

The ink viscosity-increasing component has an effect of lowering the fluidity of a part of the ink and/or the components constituting the ink on the ink receiving medium, thereby suppressing bleeding and beading in first image formation. In the present invention, such an increase in the viscosity of the ink is also referred to as "viscously thickening of the ink". A known component such as a polyvalent metal ion, an organic acid, a cationic polymer, or a porous fine particle can be used as the ink viscosity-increasing component. In particular, a polyvalent metal ion and an organic acid are particularly suitable. A plurality of kinds of the ink viscosity-increasing components are also suitably contained. Herein, the content of the ink viscosity-increasing component in the reaction liquid can be 5% by mass or more based on the total mass of the reaction liquid.

Examples of the polyvalent metal ion include divalent metal ions such as $Ca^{2+}$, $Cu^{2+}$, $Ni^{2+}$, $Mg^{2+}$, $Sr^{2+}$, $Ba^{2+}$ and $Zn^{2+}$, and trivalent metal ions such as $Fe^{3+}$, $Cr^{3+}$, $Y^{3+}$ and $Al^{3+}$.

Examples of the organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyron carboxylic acid, pyrrole carboxylic acid, furan carboxylic acid, pyridine carboxylic acid, coumaric acid, thiophene carboxylic acid, nicotinic acid, oxysuccinic acid and dioxysuccinic acid.

The reaction liquid can contain a proper amount of water or an organic solvent low in volatility, as the aqueous liquid medium. The water used here can be water deionized by ion exchange or the like. The organic solvent that can be used in the reaction liquid to be applied in the present invention is not particularly limited, and a known organic solvent can be used therefor.

The reaction liquid can be used with the surface tension and the viscosity being appropriately adjusted by addition of a surfactant and/or a viscosity modifier. The material used is not particularly limited as long as the material can co-exist with the ink viscosity-increasing component. Examples of the surfactant specifically used include an acetylene glycol ethylene oxide adduct ("Acetylenol E100" produced by Kawaken Fine Chemicals Co., Ltd., trade name), fluorine-type surfactants such as perfluoroalkyl ethylene oxide adducts ("Megafac F444" produced by DIC Corporation, trade name, "Capstone FS-3100" The Chemours Company LLC, trade name, and Zonyl FS3100 produced by DuPont, trade name), and silicone-type surfactants such as a polyether-modified polydimethylsiloxane adduct ("BYK 349" produced by BYK, trade name).

Herein, an aqueous liquid component obtained by allowing the reaction liquid to act on the ink can be utilized as the wetting liquid. In such a case, the composition(s) of the ink and/or the reaction liquid is/are adjusted so that the contact angle of the mixture (aqueous liquid component) to the first surface of the water repellent porous body is less than 90°. Adjustment of the contact angle of the mixture can be performed by selecting the kind and the amount of the surfactant added to the ink and/or the reaction liquid.

<Ink Applying Device>

An ink jet head is used as the ink applying device that applies the ink. Examples of the ink jet head include a form where the ink is discharged by allowing film boiling to occur on the ink by an electrothermal converter to thereby form air bubbles, a form where the ink is discharged by an electro-mechanical converter and a form where the ink is discharged by use of static electricity. In the present invention, a known ink jet head can be used. In particular, a form where an electrothermal converter is utilized is suitably used particularly from the viewpoint of printing at a high speed and a high density. Drawing receives an image signal and allows an amount of the ink, necessary for each position, to be applied.

While the amount of the ink applied can be expressed as the image density (duty) and the ink thickness, the amount of the ink applied (g/m$^2$) is defined as the average value obtained by multiplying the mass of each ink dot with the number of dots applied and dividing the resultant by the printed area in the present invention. Herein, the maximum amount of the ink applied in an image region represents the amount of the ink applied in an area of at least 5 mm$^2$ or more in a region used for the information on the ink receiving medium, from the viewpoint of removal of the liquid component in the ink.

The ink jet recording apparatus of the present invention may include a plurality of ink jet heads in order to apply inks of respective colors onto the ink receiving medium. For example, when a yellow ink, a magenta ink, a cyan ink and a black ink are used to form respective color images, the ink jet recording apparatus has four ink jet heads which discharge the above respective four inks on the ink receiving medium.

The ink applying device may include an inkjet head that discharges an ink (clear ink) containing no coloring material.

<Ink>

The respective components of an ink applied in the present invention are described.

(Coloring Material)

The coloring material contained in the ink applied to the present invention can include a pigment. For example, a pigment or a mixture of a dye and a pigment can be used as the coloring material. The kind of the pigment that can be used as the coloring material is not particularly limited. Specific examples of the pigment can include inorganic pigments such as carbon black; and organic pigments such as azo-type, phthalocyanine-type, quinacridone-type, isoindolinone-type, imidazolone-type, diketopyrrolopyrrole-type and dioxazine-type pigments. Such pigments can be, if necessary, used singly or in combinations of two or more kinds thereof.

The kind of the dye that can be used as the coloring material is not particularly limited. Specific examples of the dye can include a direct dye, an acidic dye, a basic dye, a dispersion dye and an edible dye, and a dye having an anionic group can be used. Specific examples of the dye backbone include an azo backbone, a triphenylmethane backbone, a phthalocyanine backbone, an azaphthalocyanine backbone, a xanthene backbone and an anthrapyridone backbone.

The content of the pigment in the ink is preferably 0.5% by mass or more and 15.0% by mass or less, more preferably 1.0% by mass or more and 10.0% by mass or less based on the total mass of the ink.

(Dispersant)

A known dispersant for use in an ink jet ink can be used as the dispersant that allows the pigment to be dispersed. In particular, a water-soluble dispersant having both of a hydrophilic moiety and a water repellent moiety in the structure can be used in a mode of the present invention. In particular, a pigment dispersant made of a resin including at least a hydrophilic monomer and a water repellent monomer, obtained by copolymerization thereof, can be used. Each monomer used here is not particularly limited, and a known monomer is suitably used. Specific examples of the water repellent monomer include styrene and other styrene derivatives, alkyl (meth)acrylate, and benzyl (meth)acrylate. Specific examples of the hydrophilic monomer include acrylic acid, methacrylic acid and maleic acid.

The acid value of the dispersant can be 50 mgKOH/g or more and 550 mgKOH/g or less. The weight average molecular weight of the dispersant can be 1000 or more and 50000 or less. Herein, the mass ratio (pigment:dispersant) of the pigment and the dispersant can be in the range from 1:0.1 to 1:3.

It is also suitable in the present invention not to use any dispersant, but to use a so-called self-dispersion pigment that can be dispersed by surface modification of the pigment by itself.

(Resin Fine Particle)

The ink applied to the present invention may contain various fine particles not having any coloring material. In particular, the resin fine particle is suitable because of being sometimes effective for enhancements in image quality and fittability in some cases. The resin fine particle is more suitable because of being sometimes more effective for an enhancement in fittability owing to aggregation of the reaction liquid.

The material of the resin fine particle that can be used in the present invention is not particularly limited, and a known resin can be appropriately used. Specific examples include homopolymers such as polyolefin, polystyrene, polyurethane, polyester, polyether, polyurea, polyamide, polyvinyl alcohol, poly(meth)acrylic acid and salts thereof, polyalkyl (meth)acrylate and polydiene, or copolymers obtained by polymerization of a plurality of monomers for production of such homopolymers, in combination. The weight average molecular weight (Mw) of the resin is suitably in the range of 1,000 or more and 2,000,000 or less. The amount of the resin fine particle in the ink is preferably 1% by mass or more and 50% by mass or less, more preferably 2% by mass or more and 40% by mass or less based on the total mass of the ink.

Furthermore, in an aspect of the present invention, the resin fine particle can be used as a resin fine particle dispersion in which the resin fine particle is dispersed in a liquid. A dispersion procedure is not particularly limited, and a so-called self-dispersion-type resin fine particle dispersion where a resin obtained by homopolymerization of a monomer having a dissociable group or copolymerization of a plurality of such monomers is used and dispersed is suitable. Examples of the dissociable group include a carboxyl group, a sulfonic acid group and a phosphoric acid group, and examples of the monomer having such a dissociable group include acrylic acid and methacrylic acid. In addition, a so-called emulsion and dispersion type resin fine particle dispersion where the resin fine particle is dispersed by an emulsifier can also be again suitably used in the present invention. The emulsifier referred here can be a known surfactant regardless of whether the molecular weight is low or high. The surfactant can be a nonionic surfactant or a surfactant having the same charge as in the resin fine particle.

The resin fine particle dispersion for use in an aspect of the present invention preferably has a dispersion particle size of 10 nm or more and 1000 nm or less, still more preferably has a dispersion particle size of 50 nm or more and 500 nm or less, further preferably has a dispersion particle size of 100 nm or more and 500 nm or less. In addition, when the resin fine particle dispersion for use in an aspect of the present invention is produced, various additives can also be added for stabilization. Examples of such additives include n-hexadecane, dodecyl methacrylate, stearyl methacrylate, chlorobenzene, dodecylmercaptan, a blue dye (blueing agent) and polymethyl methacrylate.

(Curing Component)

In the present invention, either of the reaction liquid or the ink can contain a component to be cured by active energy ray. The component to be cured by active energy ray may be cured before the liquid absorbing step, thereby suppressing attachment of the coloring material to the liquid absorbing member.

As the component to be cured by irradiation with active energy ray, for use in the present invention, a component that is cured by irradiation with active energy ray and thus is more insoluble than the component before such irradiation is used. As an example, a common ultraviolet curable resin can be used. While most of ultraviolet curable resins are not dissolved in water, a material that can be adapted to an aqueous ink suitably used in the present invention can have at least an ultraviolet curable, ethylenically unsaturated bond and a hydrophilic bonding group in the structure. Examples of the bonding group for hydrophilicity include a hydroxyl group, a carboxyl group, a phosphoric acid group, a sulfonic acid group and salts thereof, an ether bond, and an amide bond. In addition, the component to be cured, for use in the present invention, can be hydrophilic. In addition, examples of the active energy ray include ultraviolet light, infrared light and electron beam.

Furthermore, in the present invention, either of the reaction liquid or the ink can include a polymerization initiator. The polymerization initiator for use in the present invention may be any compound that generates radical by active energy ray.

Furthermore, one mode is extremely preferable where a photosensitizer playing a role of expanding the absorption wavelength of light in order to enhance the reaction rate is used in combination.

(Surfactant)

The ink that can be used in the present invention may include a surfactant. Specific examples of the surfactant include an acetylene glycol ethylene oxide adduct (Acetylenol E100, produced by Kawaken Fine Chemicals Co., Ltd.). The amount of the surfactant in the ink can be 0.01% by mass or more and 5.0% by mass or less based on the total mass of the ink.

As previously described in the section of the reaction liquid, the composition(s) of the ink and/or the reaction liquid can be adjusted so that the contact angle of the aqueous liquid component obtained by action of the reaction liquid on the ink, to the first surface of the porous body, is less than 90°. Adjustment of the contact angle of the mixture can be performed by selecting the kind and the amount of the surfactant added to the ink and/or the reaction liquid.

(Water and Water-Soluble Organic Solvent)

As the ink, an aqueous ink including at least water as the liquid medium is used. As the aqueous ink, an aqueous pigment ink including at least a pigment as the coloring material can be used.

The liquid medium can further, if necessary, include a water-soluble organic solvent. Such water can be water deionized by ion exchange or the like. In addition, the content of such water in the ink is preferably 30% by mass or more and 97% by mass or less based on the total mass of the ink, more preferably 50% by mass or more and 95% by mass or less based on the total mass of the ink.

The kind of the water-soluble organic solvent used is not particularly limited, and any known organic solvent can be used. Specific examples include glycerin, diethylene glycol, polyethylene glycol, polypropylene glycol, ethylene glycol, propylene glycol, butylene glycol, triethylene glycol, thiodiglycol, hexylene glycol, ethylene glycol monomethyl ether, diethylene glycol monomethyl ether, 2-pyrrolidone, ethanol and methanol. Of course, two or more kinds selected therefrom can also be used.

In addition, the content of the water-soluble organic solvent in the ink can be 3% by mass or more and 70% by mass or less based on the total mass of the ink.

(Other Additives)

The ink that can be used in the present invention may contain, in addition to the above components, if necessary, various additives such as a pH adjuster, an anticorrosive agent, a preservative agent, a mildew-proofing agent, an autoxidizing agent, a reduction preventing agent, a water-soluble resin and a neutralizing agent thereof, and a viscosity modifier.

<Liquid Absorbing Member>

In the present invention, at least a part of the aqueous liquid component from the first image is allowed to be in contact with the liquid absorbing member having the porous body and thus is absorbed, resulting in reduction in the content of the liquid component in the first image. The contact surface of the liquid absorbing member with the first image is defined as a first surface, and the porous body is disposed on the first surface.

(Porous Body)

The porous body in the present invention has water repellency in order to lower affinity for the coloring material included in the first image (enhance releasability of the coloring material). The contact angle of water with the water repellent porous body can be 90° or more. The present inventors have made intensive studies and as a result have found that a porous body whose contact angle of water is 90° or more can be used to thereby suppress attachment of the coloring material of the ink to the porous body. The contact angle herein means an angle formed by the surface of a subject (the first surface of the porous body) and a tangent line of a droplet made by dropping of a measurement liquid (water, wetting liquid or the like) on the subject, at a portion of the droplet in contact with the subject. While some kinds of measurement procedures are present, the present inventors have measured the contact angle of the first surface of the porous body according to the procedure described in "6. Sessile drop method" of JIS R3257. Herein, water used as the measurement liquid is pure water (distilled water).

In addition, the material of the porous body is not particularly limited as long as the contact angle of water is 90° or more, and the material can be made of a water repellent resin. Furthermore, the water repellent resin can be a fluororesin. Specific examples of the fluororesin include polytetrafluoroethylene (hereinafter, PTFE), polychlorotrifluoroethylene (PCTFE), polyvinylidene fluoride (PVDF), polyvinyl fluoride (PVF), perfluoroalkoxy fluororesin (PFA), tetrafluoroethylene-hexafluoropropylene copolymer (FEP), an ethylene-tetrafluoroethylene copolymer (ETFE), ethylene-chlorotrifluoroethylene copolymer (ECTFE). Such resins can be, if necessary, used singly or in combination of two or more kinds thereof, and a configuration where a plurality of films are laminated may also be adopted. In particular, polytetrafluoroethylene can be adopted.

In addition, the pore diameter of the porous body can be small in order to suppress attachment of the coloring material of the ink, and the pore diameter of at least a surface (first surface) of the porous body, in contact with the first image, can be 10 µm or less. In addition, the lower limit of the pore diameter of the porous body is not particularly limited and can be, for example, 0.02 µm or more. In the present invention, the pore diameter means an average diameter and can be measured by a known procedure such as a mercury intrusion method, a nitrogen adsorption method or SEM image observation.

In addition, the thickness of the porous body can be thinner in order to impart uniformly high air permeability. The air permeability can be expressed as the Gurley value prescribed in JIS P8117, and the Gurley value can be 10 seconds or less. In addition, the lower limit of the Gurley value is not particularly limited and can be, for example, 0.1 seconds or more. The shape of the porous body is not particularly limited, and examples thereof include a roller shape and a belt shape. If the porous body is thinner, however, a volume necessary for absorption of the liquid component cannot be sufficiently ensured in some cases, and therefore the porous body can have a multilayer configuration. In addition, in the liquid absorbing member 105a, a layer on the transfer body, to be in contact with an image, may be the porous body, and a layer on the transfer body, not to be in contact with an image, may not be the porous body.

In addition, the production method of the porous body is not particularly limited, and a production method conventionally widely used can be applied. One example includes a production method of a porous body obtained by biaxially stretching a resin containing polytetrafluoroethylene, described in Japanese Patent No. 1114482.

<Multilayer Configuration>

Next, an embodiment where the porous body has a multilayer configuration is described. Herein, the embodiment is described under the assumption that a layer to be in contact with the first image is a first layer and a layer laminated on a surface opposite to the contact surface of the first layer with the first image is a second layer. With respect to a configuration of further multiple layers, such multiple layers are sequentially designated in the order of lamination from the first layer. Herein, the first layer may be referred to as an "absorption layer" and the second or more layers may be referred to as "support layers".

[First Layer]

In order to suppress attachment of the coloring material and in order to increase cleaning properties, the above-mentioned water repellent porous body is used in the first layer. Such resins can be, if necessary, used singly or in combination of two or more kinds thereof, and a configuration where a plurality of films are laminated in the first layer may also be adopted.

When the first layer is constituted by a water repellent material, the effect of sucking up the aqueous liquid component by a capillary force is not almost exerted, and any time may be taken for sucking up of the aqueous liquid component in the first contact with an image. Therefore, the first layer can be soaked with a wetting liquid whose contact angle to the surface of the first layer is less than 90°. The first layer can be soaked with the wetting liquid by applying the wetting liquid to the first surface of the liquid absorbing member according to a coating method or the like.

The wetting liquid can be prepared by mixing a surfactant or a liquid low in contact angle to the surface of the first layer with a liquid medium including water. The wetting liquid with which the porous body is impregnated is gradually replaced with the aqueous liquid component absorbed from the first image, and therefore the absorption efficiency of the first layer may be gradually reduced in some cases. Therefore, the first surface of the porous body of the liquid absorbing member can be coated with the wetting liquid by application of the wetting liquid every a predetermined number of times.

In addition, as described above, the composition(s) of the reaction liquid and/or the ink is/are adjusted to thereby allow the contact angle of the first layer of the aqueous liquid component included in the first image to the first surface to be less than 90°, thereby enabling the aqueous liquid component to be utilized as the wetting liquid. In this case, the reaction liquid and/or the ink can contain a surfactant or a liquid low in contact angle to the first surface of the porous body having water repellency, thereby adjusting the contact angle of such an aqueous liquid component.

In the present invention, the film thickness of the first layer is preferably 50 µm or less, more preferably 30 µm or less, further preferably 1 µm or more and 30 µm or less. In Examples of the present invention, the film thickness of each layer of the porous body was obtained by measuring the film thickness at any 10 points by a straight-type micrometer OMV25 (manufactured by Mitutoyo Corporation) and calculating the average value.

The first layer can be produced by a known method for producing a thin porous film. For example, the first layer can be obtained by subjecting a resin material to a method such as extrusion, to provide a sheet-shaped product, and thereafter stretching the extruded product to a predetermined thickness. In addition, the first layer can also be obtained as a porous film by adding a plasticizer such as paraffin to the material in extrusion and removing the plasticizer by heating or the like in stretching. The pore diameter can be modulated by appropriately adjusting the amount of the plasticizer to be added, the draw ratio and the like.

[Second Layer]

In the present invention, the second layer can be a layer having air permeability. Such a layer may be a non-woven fabric or woven fabric of a resin fiber. The material of the second layer is not particularly limited and can be a material where the contact angle to the aqueous liquid component absorbed from an image is equal to or smaller than the contact angle to the first layer in order that a liquid absorbed in the first layer does not flow back. Specifically, such a material can be selected from the group consisting of a single material such as polyolefin (polyethylene (PE), polypropylene (PP) or the like), polyurethane, nylon, polyamide, polyester (polyethylene terephthalate (PET) or the like) or polysulfone (PSF), or a composite material thereof. In addition, the second layer can be a layer larger in pore diameter than the first layer.

[Third Layer]

In the present invention, the porous body of a multilayer structure may be configured from 3 or more layers and is not limited. A third layer (also referred to as "third layer") or more layers can be made of a non-woven fabric from the viewpoint of rigidity. As the material, the same as in the second layer can be used.

[Other Materials]

The liquid absorbing member may have a reinforcement member which reinforces the lateral face of the liquid absorbing member, in addition to the porous body having a layered structure as described above. In addition, the liquid absorbing member may have a joining member that connects the ends in the longitudinal direction of a long sheet-shaped porous body to form a belt-shaped member. A non-porous tape material or the like can be used as such a material and may be disposed at a position or a cycle in no contact with an image.

[Method for Producing Porous Body]

The method for forming the porous body by laminating the first layer and the second layer is not particularly limited. The first layer and the second layer may be merely deposited on each other or may be bonded to each other using a method such as lamination by adhesive agent or lamination by heating. In the present invention, lamination by heating can be adopted from the viewpoint of air permeability. Alternatively, for example, a portion of the first layer or the second layer may be melted by heating for adhesive lamination. In addition, a fusion material such as a hot-melt powder may be allowed to intervene between the first layer and the second layer and the resultant may be adhesively laminated with each other by heating. In the case of laminating the third or more layers, these layers may be laminated at once or may be sequentially laminated, and the order of lamination is appropriately selected. A lamination method including heating porous body while pressurizing the porous body sandwiched by a roller heated can be used in a heating step.

Next, a specific embodiment example of the ink jet recording apparatus of the present invention is described.

Examples of the ink jet recording apparatus of the present invention include an ink jet recording apparatus where a first image is formed on a transfer body as an ink receiving medium and a second image being an image after an aqueous liquid component is absorbed by a liquid absorbing member is transferred to a recording medium, and an ink jet recording apparatus where a first image is formed on a recording medium as an ink receiving medium.

In the present invention, the former ink jet recording apparatus is referred to as a transfer-type ink jet recording apparatus for the sake of convenience, and the latter ink jet recording apparatus is referred to as a direct drawing type ink jet recording apparatus for the sake of convenience.

Hereinafter, each ink jet recording apparatus is described.

(Transfer-Type Ink Jet Recording Apparatus)

Figure 3:
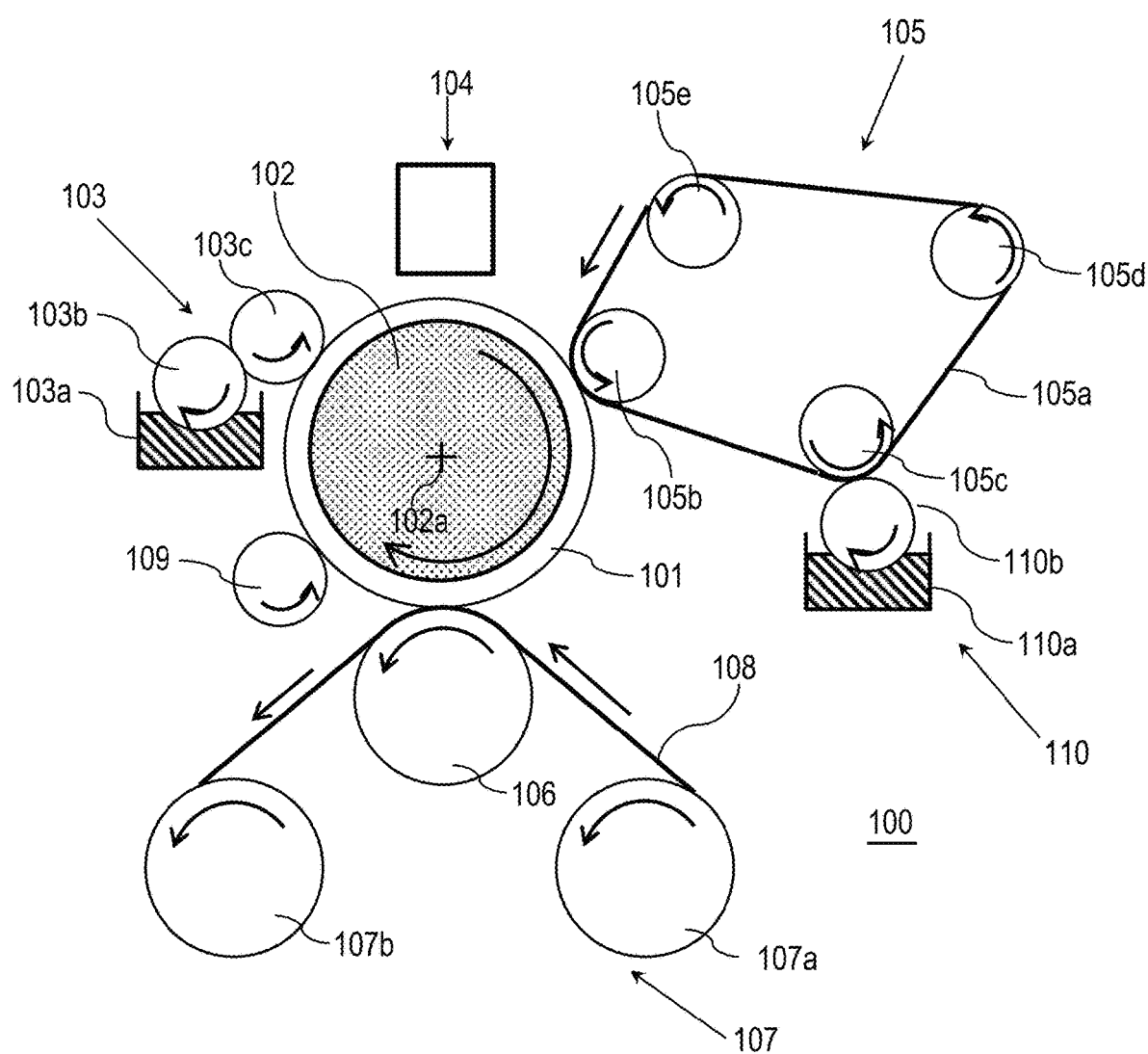
FIG. 3 is a schematic view illustrating one example of the configuration of a transfer-type ink jet recording apparatus in one embodiment of the present invention.

FIG. 3 is a schematic view illustrating one example of the configuration outline of a transfer-type ink jet recording apparatus of the present embodiment. A transfer-type ink jet recording apparatus 100 includes a transfer body 101 that temporarily holds a first image and a second image where at least a part of an aqueous liquid component is removed from the first image. In addition, the transfer-type ink j et recording apparatus 100 includes a transfer unit including a pressing member 106 for transferring, which transfers the second image onto a recording medium 108 on which an image is to be formed, namely, a recording medium for forming a final image depending on the intended use.

The transfer-type ink jet recording apparatus 100 of the present invention includes a transfer body 101 supported by a supporting member 102, a reaction liquid applying device 103 that applies a reaction liquid onto the transfer body 101, an ink applying device 104 that applies an ink onto the transfer body 101 to which the reaction liquid is applied, to form an ink image (first image) on the transfer body, a liquid absorbing device 105 that absorbs a liquid component from the first image on the transfer body, and a pressing member 106 that presses the recording medium to thereby transfer the second image on the transfer body from which the liquid component is removed, onto the recording medium 108 such as paper. In addition, the transfer-type inkjet recording apparatus 100 may include a transfer body cleaning member 109 that cleans the surface of the transfer body 101 after the second image is transferred to the recording medium 108.

The supporting member 102 rotates around a rotational axis 102a in a direction indicated by an arrow of FIG. 3. Rotation of the supporting member 102 allows the transfer body 101 to move. A reaction liquid by the reaction liquid applying device 103 and an ink by the ink applying device 104 are sequentially applied onto the moving transfer body 101, to form the first image on the transfer body 101. The first image formed on the transfer body 101 is allowed to move to a position at which the ink image is in contact with the liquid absorbing member 105a of the liquid absorbing device 105, by movement of the transfer body 101. The liquid absorbing member 105a of the liquid absorbing device 105 moves in synchronization with the rotation of the transfer body 101. The first image formed on the transfer body 101 undergoes the state of being in contact with the moving liquid absorbing member 105a. During such contact, the liquid absorbing member 105a removes the liquid component from the first image.

Herein, the first image undergoes the state of being in contact with the liquid absorbing member 105a, thereby allowing the liquid component included in the first image to be removed. In such a contact state, the liquid absorbing member 105a can be pressed with predetermined pressing force against the first image from the viewpoint of allowing the liquid absorbing member 105a to effectively function.

The removal of the liquid component can be expressed from a different point of view as concentrating the ink constituting the image (first image) formed on the transfer body. Concentrating the ink means that the proportion of the solid content contained in the ink, such as coloring material and resin, with respect to the liquid component contained in the ink increases owing to reduction in the liquid component. An image (second image) from which the liquid component is removed is allowed to move to the transfer unit to be in contact with the recording medium 108 conveyed by a recording medium conveyance device 107, by movement of the transfer body 101. The pressing member 106 presses the recording medium 108 during the contact of the second image after removal of the liquid component, with the recording medium 108, thereby allowing the ink image to be transferred onto the recording medium 108.

The ink image after transfer onto the recording medium 108 is a reverse image of the second image. In the following description, such an ink image after transfer may be referred to as a "third image", separately from the above-mentioned first image (ink image before liquid removal) and second image (ink image after liquid removal).

Herein, the reaction liquid is applied onto the transfer body and thereafter an ink is applied thereonto to form the first image, and therefore the reaction liquid remains in a non-image region (region on which no ink image is formed)

with not reacting with the ink. In the present apparatus, the liquid absorbing member 105*a* is contact (pressure contact) with not only the reaction liquid from the first image, but also an unreacted reaction liquid, and also removes the liquid component of the reaction liquid from the surface of the transfer body 101.

Thus, while the above description is made with expressing as "the liquid component is removed from the first image", such an expression does not mean a limitation as removal of the liquid component from only the first image, but means that the liquid component may be removed from at least the first image on the transfer body. For example, not only the liquid component on the first image, but also the liquid component in the reaction liquid applied to an outer region of the first image can be removed. Herein, the liquid component is not particularly limited as long as the liquid component is any liquid component having no certain shape and having fluidity and a substantially constant volume. Examples of the liquid component include water and an organic solvent included in the ink and the reaction liquid.

Even when the above-mentioned clear ink is included in the first image, concentrating the ink by the liquid absorbing treatment can be performed. For example, when the clear ink is applied on a color ink containing a coloring material applied onto the transfer body 101, the clear ink is present entirely in the surface of the first image, or the clear ink is present partially at one location or a plurality locations on the surface of the first image, and the color ink is present in other locations. The porous body absorbs the liquid component of the clear ink and the liquid component of the clear ink moves on the surface of the first image at any location where the clear ink is present on the color ink in the first image. Concomitantly, the liquid component in the color ink moves towards the porous body, thereby allowing the aqueous liquid component in the color ink to be absorbed.

On the other hand, the liquid component of each of the color ink and the clear ink moves towards the porous body at any location where a region of the clear ink and a region of the color ink are present in the surface of the first image, thereby allowing the aqueous liquid component to be absorbed. Herein, a large amount of a component for an enhancement in transferability of an image from the transfer body 101 to the recording medium may be included in the clear ink. For example, the content of a component increased in adhesiveness to the recording medium rather than the color ink by heating is higher.

Each component of the transfer-type ink jet recording apparatus of the present embodiment is described below.

<Transfer Body>

The transfer body 101 includes a surface layer including an image forming surface. As the member of the surface layer, various materials such as resin and ceramic can be appropriately used, and a material high in compressive elastic modulus can be adopted in terms of durability and the like. Specific examples thereof include an acrylic resin, an acrylic silicone resin, a fluorine-containing resin, and a condensate obtained by condensing a hydrolyzable organosilicon compound.

In order to enhance wettability, transferability and the like of the reaction liquid, any surface treatment may be performed for use. Examples of the surface treatment include frame treatment, corona treatment, plasma treatment, polishing treatment, roughening treatment, active energy ray irradiation treatment, ozone treatment, surfactant treatment and silane coupling treatment. A plurality of such treatments may be combined. In addition, the surface layer can also be provided with an arbitrary surface shape.

The transfer body can also include a compressive layer having a function of absorbing pressure fluctuation. The compressible layer can be provided to thereby allow the compressible layer to absorb deformation, to disperse local pressure fluctuation and to maintain favorable transferability even at in high-speed printing. Examples of the member of the compressible layer include acrylonitrile-butadiene rubber, acrylic rubber, chloroprene rubber, urethane rubber and silicone rubber.

The rubber material, when molded, can be mixed with a predetermined amount of a vulcanizing agent, a vulcanization accelerator or the like and further mixed, if necessary, with a foaming agent or a filler such as a hollow fine particle or common salt, and the resulting porous material can be used. Thus, an air bubble portion is compressed with volume change against various pressure fluctuations, and therefore less deformation in a direction other than the direction of the compression, and more stable transferability and durability can be obtained. The porous rubber material includes one having a continuous pore structure where pores continue to each other, and one having an independent pore structure where each pore is independent. In the present invention, any of the structures can be used, and such structures may be used in combination.

The transfer body can further include an elastic layer between the surface layer and the compressible layer. Various materials such as resin and ceramic can be appropriately used in the member of the elastic layer. Various elastomer materials or rubber materials can be used in terms of processing characteristics and the like. Specific examples include fluorosilicone rubber, phenylsilicone rubber, fluororubber, chloroprene rubber, urethane rubber, nitrile rubber, ethylene-propylene rubber, natural rubber, styrene rubber, isoprene rubber, butadiene rubber, an ethylene/propylene/butadiene copolymer and nitrile-butadiene rubber. In particular, silicone rubber, fluorosilicone rubber and phenylsilicone rubber can be adopted in terms of dimensional stability and durability because of being small in compression set. In addition, such materials can also be adopted in terms of transferability because of being small in the change in elastic modulus due to temperature.

Various adhesive agents or double-faced tapes may be used for fixing or holding each layer (surface layer, elastic layer and compressible layer) constituting the transfer body, between such layers. In addition, a reinforcement layer high in compressive elastic modulus may be provided in order to suppress lateral extension or keep strength in installing in the apparatus. Alternatively, a woven fabric may be adopted as the reinforcing layer. The transfer body can be prepared by arbitrarily combining each of layers made of the materials described above.

The size of the transfer body can be arbitrarily selected according to an objective printing image size. The shape of the transfer body is not particularly limited, and specific examples thereof include a sheet shape, a roller shape, a belt shape and an endless web shape.

<Supporting Member>

The transfer body 101 is supported on the supporting member 102. Various adhesive agents or double-faced tapes may be used in a method for supporting the transfer body. Alternatively, a member for installation made of a material such as a metal, a ceramic or a resin may be attached to the transfer body, thereby using the member for installation to support the transfer body on the supporting member 102.

The supporting member 102 is required to have structural strength to some extent from the viewpoint of conveyance accuracy and durability. A metal, a ceramic, a resin or the like can be used as the material of the supporting member. In particular, aluminum, iron, stainless, an acetal resin, an epoxy resin, polyimide, polyethylene, polyethylene terephthalate, nylon, polyurethane, silica ceramic or alumina ceramics can be used in order to not only impart rigidity and dimension accuracy that can resist pressurization in transfer, but also reduce inertia in operation for an improvement in the response of control. Alternatively, such materials may be used in combination.

<Reaction Liquid Applying Device>

The ink jet recording apparatus of the present embodiment includes the reaction liquid applying device 103 which applies a reaction liquid to the transfer body 101. The reaction liquid applying device 103 of FIG. 3 is illustrated as a gravure offset roller including a reaction liquid receiving unit 103a which stores the reaction liquid, and reaction liquid applying members 103b and 103c which apply the reaction liquid in the reaction liquid receiving unit 103a onto the transfer body 101.

<Ink Applying Device>

The ink jet recording apparatus of the present embodiment includes the ink applying device 104 which applies ink to the transfer body 101 to which the reaction liquid is applied. The first image is formed by mixing the reaction liquid and ink, and then a liquid component is absorbed from the first image by the liquid absorbing device 105.

<Liquid Absorbing Device>

In the present embodiment, the liquid absorbing device 105 includes a liquid absorbing member 105a, and a pressing member 105b for liquid absorption which presses the liquid absorbing member 105a against the first image on the transfer body 101. The liquid absorbing member 105a and the pressing member 105b are not limited to particular shapes. For example, as illustrated in FIG. 3, the pressing member 105b has a columnar shape, and the liquid absorbing member 105a has a belt shape, and may be configured such that the columnar-shaped pressing member 105b presses the belt-shaped liquid absorbing member 105a against the transfer body 101. Alternatively, the liquid absorbing device 105 includes the pressing member 105b having a columnar shape and the liquid absorbing member 105a having a cylindrical shape formed on a peripheral surface of the columnar-shaped pressing member 105b, and may be configured such that the columnar-shaped pressing member 105b presses the cylindrical-shaped liquid absorbing member 105a against the transfer body.

In the present invention, the liquid absorbing member 105a can have a belt shape in consideration of space within the ink jet recording apparatus. The liquid absorbing device 105 having such a belt-shaped liquid absorbing member 105a may include extending members which extend the liquid absorbing member 105a. In FIG. 3, reference numerals 105c, 105d, and 105e each denote an extending roller as the extending member. In FIG. 3, the pressing member 105b is illustrated as a roller member that rotates, as in the extending roller, but is not limited thereto.

In the liquid absorbing device 105, the liquid absorbing member 105a having a porous body is pressed against the first image by the pressing member 105b so that a liquid component included in the first image is absorbed to the liquid absorbing member 105a to remove the liquid component from the first image. In addition to this system of pressing the liquid absorbing member, various other approaches conventionally used, for example, a method based on heating, a method of blowing low humid air, and a method of reducing pressure may be combined as a method of reducing the liquid component in the first image.

The temperature in a treatment with the porous body of the liquid absorbing member to the first image by the liquid absorbing device can be set in a range in which an intended liquid absorption effect can be obtained. In a case where the wetting liquid includes a surfactant for adjusting a contact angle, the temperature upon contact between a first surface of the porous body and the first image can be controlled to a temperature less than the cloud point of the surfactant contained in the wetting liquid. Since the temperature of the porous body is less than the cloud point of the surfactant in the wetting liquid, an intended contact-angle adjusting function of the surfactant can be more effectively used.

The temperature upon contact between the first surface of the porous body and the first image in the case where the temperature is less than the cloud point of the surfactant in the wetting liquid can be in the range from 5° C. to 60° C. The temperature control upon contact between the first surface of the porous body and the first image can be performed by disposing a temperature controller including a temperature control unit including a heating unit, and, when necessary, a cooling unit depending on the configuration of the ink jet recording apparatus according to the present invention. The temperature control upon this contact can be performed by disposing the temperature control unit inside or near and outside the pressing member 105b illustrated in FIG. 3 and FIG. 4, for example. The heating unit and the cooling unit incorporated in the temperature controller are not limited to particular types, and a known heating device or a known cooling device may be used.

Hereinafter, various conditions and configurations of the liquid absorbing device 105 will be described in detail.

(Pretreatment)

Before a water-repellent porous body comes into contact with the first image, a pretreatment can be performed by a pretreatment unit which applies the wetting liquid whose contact angle with respect to the first surface of the porous body is less than 90°. The contact angle of the wetting liquid with respect to the first surface of the porous body is less than 90°. The wetting liquid is not particularly limited as long as the porous body can obtain an intended liquid absorbency. Specifically, the wetting liquid can contain an aqueous liquid medium which is a medium containing at least water and a component that adjusts the surface tension of the wetting liquid. The component that adjusts the surface tension of this wetting liquid is not limited to a particular component, and a surfactant can be used. As the surfactant, at least one of a silicone-based surfactant and a fluorine-based surfactant is preferably used, and a fluorine-based surfactant is more preferably used.

Specific examples of the surfactant to be used include fluorine-based surfactants such as F-444 (trade name, manufactured by DIC Corporation), Zonyl FS3100 (trade name, manufactured by E.I. du Pont de Nemours and Company), Capstone FS-3100 (trade name, manufactured by The Chemours Company LLC), and silicone-based surfactants such as BYK349 (trade name, manufactured by BYK Japan KK). Water used in this case can be water deionized by ion exchange or the like. The water-soluble organic solvent is not limited to particular type, and any known organic solvent such as ethanol or isopropyl alcohol may be used. The content of the surfactant in the wetting liquid is preferably 0.2 mass % or more, more preferably 0.4 mass % or more, and especially preferably 0.5 mass % or more, of the total mass of the wetting liquid. An upper limit of the content of the surfactant in the wetting liquid is not limited to particular value, but is preferably 10 mass % of the total mass of the wetting liquid from the viewpoint of solubility in the wetting liquid of the surfactant.

Figure 5:
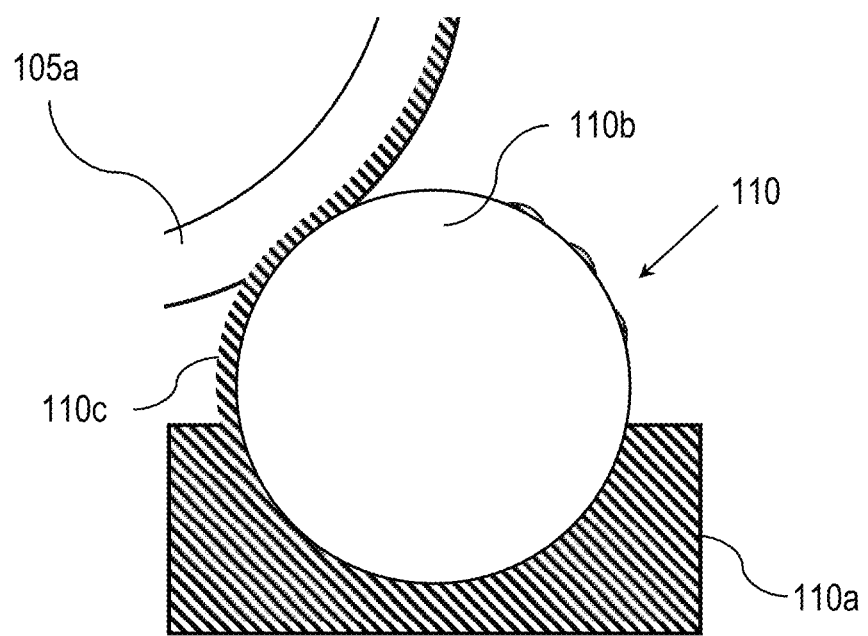
FIG. 5 is an enlarged view of a wetting liquid applying unit by a roller pressure type wetting liquid applying member against a liquid absorbing member.

A method of applying the wetting liquid to the porous body used in the present invention may be an immersion method, a coating method, a liquid drop method, or other methods, and is not limited to a particular method. To apply the wetting liquid stably or at high speed in the apparatus, a coating method using roller pressing can be used. FIG. 5 is an enlarged view of a wetting liquid applying unit which is a roller pressure type wetting liquid applying member and applies a wetting liquid to the liquid absorbing member 105a. The liquid absorbing device 105 has a configuration in which a wetting liquid 110c stored in the wetting liquid receiving unit 110a is pumped by a wetting liquid applying member 110b, and is applied, under pressure, onto the liquid absorbing member 105a.

In the present invention, the timing of applying the wetting liquid is not limited to particular timing. In the case of performing the pretreatment by rotatably driving a drum-shaped or an endless web-shaped liquid absorbing member sequentially, the timing of applying the wetting liquid may be controlled as appropriate in such a manner that the wetting liquid is applied at each rotation or once in several rotations. The wetting liquid applying device is configured to move up and down by using a motor, a cam mechanism, or an air cylinder so that the wetting liquid applying device can removably contact with the liquid absorbing member.

Figure 4:
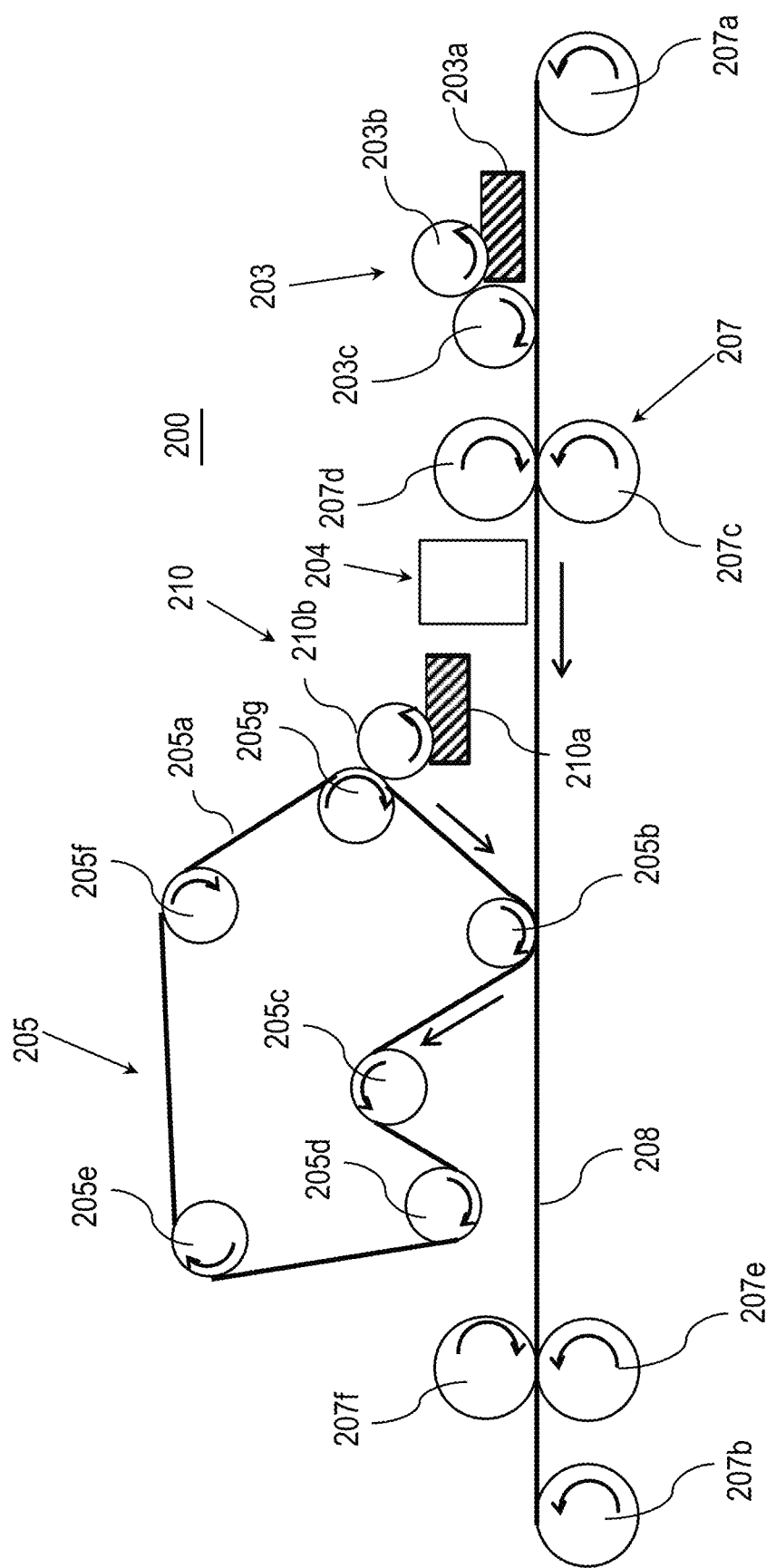
FIG. 4 is a schematic view illustrating one example of the configuration of a direct drawing type ink jet recording apparatus in one embodiment of the present invention.

In the embodiment illustrated in FIGS. 3 and 4, before the liquid absorbing member 105a is brought into contact with the first image, the pretreatment unit which applies the wetting liquid to the porous body of the liquid absorbing member can apply a wetting liquid as a pretreatment. The reaction liquid may be used instead of the wetting liquid. In other words, before the liquid absorbing member 105a is brought into contact with the first image, the reaction liquid whose contact angle with respect to a surface of the liquid absorbing member 105a is less than 90° is applied to the transfer body 101, and the reaction liquid on the transfer body 101 is transferred to the liquid absorbing member 105a, so that the reaction liquid may be used as the pretreatment of the porous body. The pressure in applying the wetting liquid is not limited to a particular value, and is preferably 0.98 N/cm² (0.1 kgf/cm²) or more because the wetting liquid can be applied stably or at high speed in the apparatus. The pressure in applying the wetting liquid is preferably 98 N/cm² (10 kgf/cm²) or less because the structural load on the apparatus can be reduced.

(Pressing Condition)

The pressure of the porous body pressing against the first image on the transfer body is preferably 2.94 N/cm² (0.3 kgf/cm²) or more to 98 N/cm² (10 kgf/cm²) or less, because the liquid component in the first image can be separated by solid-liquid separation for a shorter time and the liquid component can be removed from the first image. The pressure is preferably 98 N/cm² (10 kgf/cm²) or less because the structural load on the apparatus can be reduced in this pressure range. In the present invention, the contact pressure of a porous body against a first image represents the nip pressure between a transfer body 101 and the liquid absorbing member 105a, and is a value calculated by performing surface pressure measurement using a surface pressure distribution measuring device (I-SCAN, manufactured by Nitta Corporation) and dividing a load in a pressurization region by an area.

(Application Time)

The application time for contact of the liquid absorbing member 105a with the first image can be within 50 ms (milliseconds) in order to further suppress adhesion of the coloring material in the first image to the liquid absorbing member. In the present specification, the application time is calculated by dividing the pressure detection width in a movement direction of the ink receiving medium in the above surface pressure measurement by the movement speed of the ink receiving medium. Hereinafter, the application time is referred to as a liquid absorbing nip time.

In this manner, a second image in which the liquid component is absorbed from the first image to reduce the liquid component is formed on the transfer body 101. The second image is next transferred onto the recording medium 108 in the transfer unit. An apparatus configuration and requirements in transfer will be described.

<Transfer Pressing Member>

In the present embodiment, while the second image is in contact with the recording medium 108 being conveyed by the recording medium conveyance device 107, the transfer pressing member 106 presses the recording medium 108 so that an ink image is transferred onto the recording medium 108. The transfer onto the recording medium 108 after removal of the liquid component included in the first image on the transfer body 101 can obtain a recorded image in which curling, cockling and the like is suppressed.

The pressing member 106 needs to have a structural strength to some degree from the viewpoint of conveyance accuracy or durability of the recording medium 108. The pressing member 106 can be made of metal, ceramic, resin, or other materials. In particular, to enhance responsiveness of control by reducing an inertia during operation in addition to rigidity against pressurization in transfer and dimensional accuracy, aluminum, iron, stainless, acetal resin, epoxy resin, polyimide, polyethylene, polyethylene terephthalate, nylon, polyurethane, silica ceramic, or alumina ceramic can be used. Two or more of these may be used in combination.

The time during which the pressing member 106 presses the recording medium 108 in order to transfer the second image on the transfer body 101 onto the recording medium 108 is not limited to a particular value, and is preferably 5 ms or more to 100 ms or less in order to perform transfer appropriately and prevent impairing of durability of the transfer body. The time of pressing in the present embodiment refers to a time during which the recording medium 108 is in contact with the transfer body 101, and is a value calculated by performing a surface pressure measurement with a surface pressure distribution measuring device (I-SCAN, manufactured by Nitta Corporation) and dividing the length in the conveyance direction of a pressurization region by the conveyance speed.

The pressure with which the pressing member 106 presses the recording medium 108 in order to transfer the second image on the transfer body 101 onto the recording medium 108 is not limited to a particular value as long as the transfer is appropriately performed and durability of the transfer body is not impaired. To satisfy these requirements, the pressure is preferably 9.8 N/cm² (1 kg/cm²) or more to 294.2 N/cm² (30 kg/cm²) or less. The pressure in the present embodiment refers to a nip pressure between the recording medium 108 and the transfer body 101, and is a value calculated by performing a surface pressure measurement with a surface pressure distribution measuring device and dividing the weight in a pressurization region by the area.

The temperature at which the pressing member 106 presses the recording medium 108 in order to transfer the second image on the transfer body 101 onto the recording medium 108 is not limited to a particular value, and is preferably greater than or equal to a glass transition point or a softening point of a resin component included in the ink. Heating can be performed with a heating unit configured to heat the second image on the transfer body 101, the transfer body 101, and the recording medium 108. The transfer unit 106 is not limited to a particular shape, and may be a roller shape, for example.

<Recording Medium and Recording Medium Conveyance Device>

In the present embodiment, the recording medium 108 is not limited to particular media, and any known recording medium may be used. Examples of the recording medium include a rolled long medium and a cut-sheet medium cut into a predetermined size. Examples of a material for the recording medium include paper, a plastic film, a wooden board, a corrugated cardboard, and a metal film.

In FIG. 3, the recording medium conveyance device 107 for conveying the recording medium 108 includes a recording medium feeding roller 107a, and a recording medium winding roller 107b. The recording medium conveyance device 107 only needs to be able to convey the recording medium, and is not particularly limited to this configuration.

<Control System>

Figure 6:
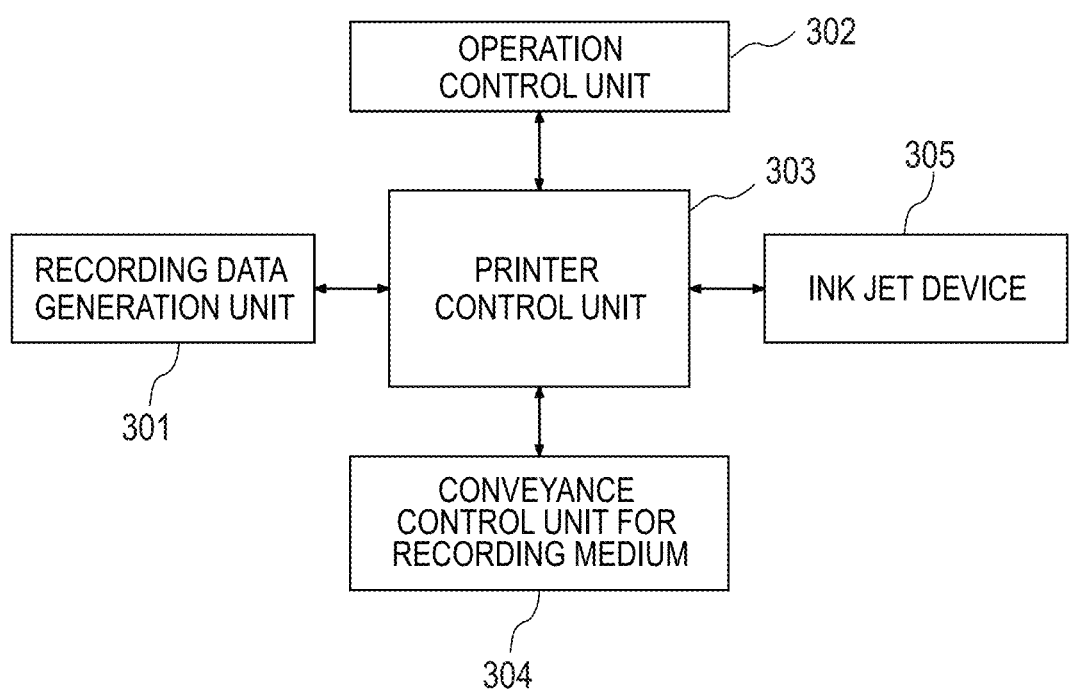
FIG. 6 is a block diagram illustrating a control system of the entire apparatus, in the ink jet recording apparatus illustrated in each of FIGS. 3 and 4.

The transfer type ink jet recording apparatus according to the present embodiment includes a control system that controls devices. FIG. 6 is a block diagram illustrating a control system of the entire transfer type ink jet recording apparatus illustrated in FIG. 3. In FIG. 6, reference numeral 301 denotes a recording data generation unit such as an external print server, reference numeral 302 denotes an operation control unit such as an operation panel, reference numeral 303 denotes a printer control unit to perform a recording process, reference numeral 304 denotes a conveyance control unit for recording medium to convey a recording medium, and reference numeral 305 denotes an ink jet device to perform printing.

Figure 7:
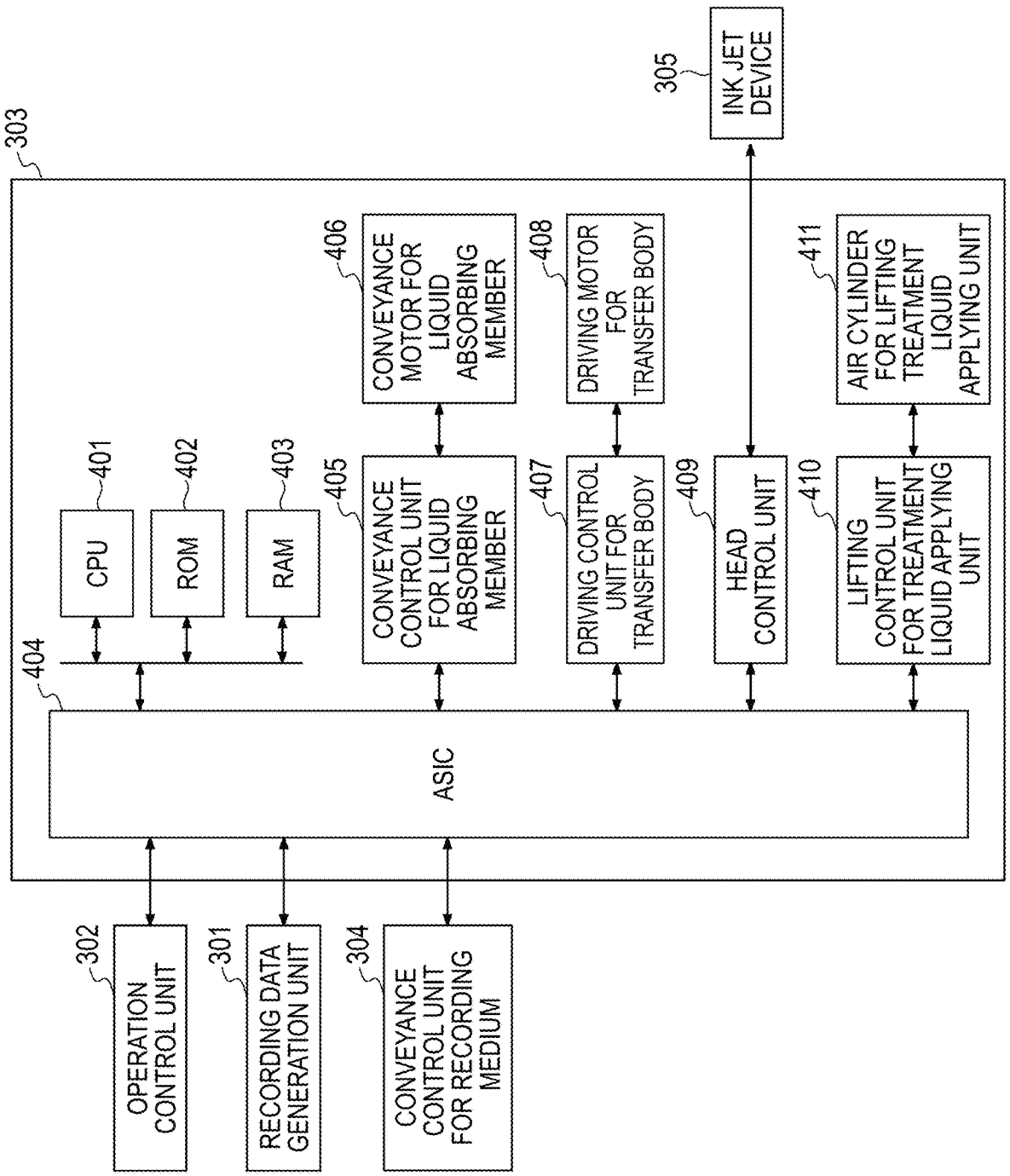
FIG. 7 is a block diagram of a printer control unit in the transfer-type ink jet recording apparatus illustrated in FIG. 3.

FIG. 7 is a block diagram of a printer control unit in the transfer type ink jet recording apparatus illustrated in FIG. 3. Reference numeral 401 denotes a CPU which controls the entire printer, reference numeral 402 denotes a ROM for storing a control program of the CPU, and reference numeral 403 denotes a RAM for executing a program. Reference numeral 404 denotes an application specific integrated circuit (ASIC) incorporating a network controller, a serial IF controller, a head data generating controller, a motor controller, and the like. Reference numeral 405 denotes a conveyance control unit for a liquid absorbing member for driving a conveyance motor for a liquid absorbing member 406, and is command-controlled by the ASIC 404 through a serial IF. Reference numeral 407 denotes a driving control unit for transfer body to drive a driving motor for transfer body 408, and is also command-controlled by the ASIC 404 through the serial IF similarly. Reference numeral 409 denotes a head control unit to generate final discharge data of the ink jet device 305 and to generate a driving voltage, for example. Reference numeral 410 denotes a lifting control unit for a wetting liquid applying device for driving an air cylinder 411 for lifting the wetting liquid applying device, and is command-controlled by the ASIC 404 through the serial IF.

(Direct Drawing Type Ink Jet Recording Apparatus)

As another embodiment of the present invention, a direct drawing type ink jet recording apparatus will be described. In the direct drawing type ink jet recording apparatus, an ink receiving medium is a recording medium on which an image is to be formed thereon.

FIG. 4 schematically illustrates an example configuration of a direct drawing type ink jet recording apparatus 200 according to this embodiment. As compared to the transfer type ink jet recording apparatus described above, the direct drawing type ink jet recording apparatus includes a configuration similar to those of the transfer type ink jet recording apparatus except that direct drawing type ink jet recording apparatus does not include any of the transfer body 101, the supporting member 102, the transfer body cleaning member 109 and forms an image on a recording medium 208.

Thus, a reaction liquid applying device 203 configured to apply a reaction liquid onto the recording medium 208, an ink applying device 204 configured to apply an ink onto the recording medium 208, and a liquid absorbing device 205 that absorbs liquid component included in the first image by a liquid absorbing member 205a that comes into contact with the first image on the recording medium 208 each have a configuration similar to that of the transfer type inkjet recording apparatus, and thus description thereof will not be repeated.

In the direct drawing type ink jet recording apparatus according to the present embodiment, the liquid absorbing device 205 includes the liquid absorbing member 205a, and a pressing member 205b for liquid absorption that presses the liquid absorbing member 205a against the first image on the recording medium 208. The liquid absorbing member 205a and the pressing member 205b are not limited to particular shapes, and may have similar shapes to those of a liquid absorbing member and a pressing member that can be used in the transfer type ink jet recording apparatus. The liquid absorbing device 205 may include extending members which extend the liquid absorbing member.

In FIG. 4, reference characters 205c, 205d, 205e, 205f, and 205g denote extending rollers as the extending members. The number of extending rollers is not limited to five as illustrated in FIG. 4, and an intended number of rollers can be arranged depending on the design of an apparatus. The direct drawing type ink jet recording apparatus may further include recording medium supporting members, not illustrated in FIG. 4, which support the recording medium from below, at a position opposed to an ink applying unit including the ink applying device 204 which applies an ink to the recording medium 208 and a position opposed to a liquid component removing unit including the liquid absorbing member 205a that comes into pressure contact with a first image on the recording medium to remove a liquid component.

<Recording Medium Conveyance Device>

In the direct drawing type inkjet recording apparatus of the present embodiment, a recording medium conveyance device 207 is not limited to particular devices, and a conveyance device in a known direct drawing type ink jet recording apparatus can be used. For example, as illustrated in FIG. 4, a recording medium conveyance device including a recording medium feeding roller 207a, a recording medium winding roller 207b, and conveyance rollers 207c, 207d, 207e, and 207f for a recording medium may be used.

<Control System>

The direct drawing type ink jet recording apparatus according to the present embodiment includes a control system that controls devices. A block diagram of the control system of the entire direct drawing type ink jet recording apparatus illustrated in FIG. 4 is as illustrated in FIG. 6 as with the transfer type ink jet recording apparatus illustrated in FIG. 3.

Figure 8:
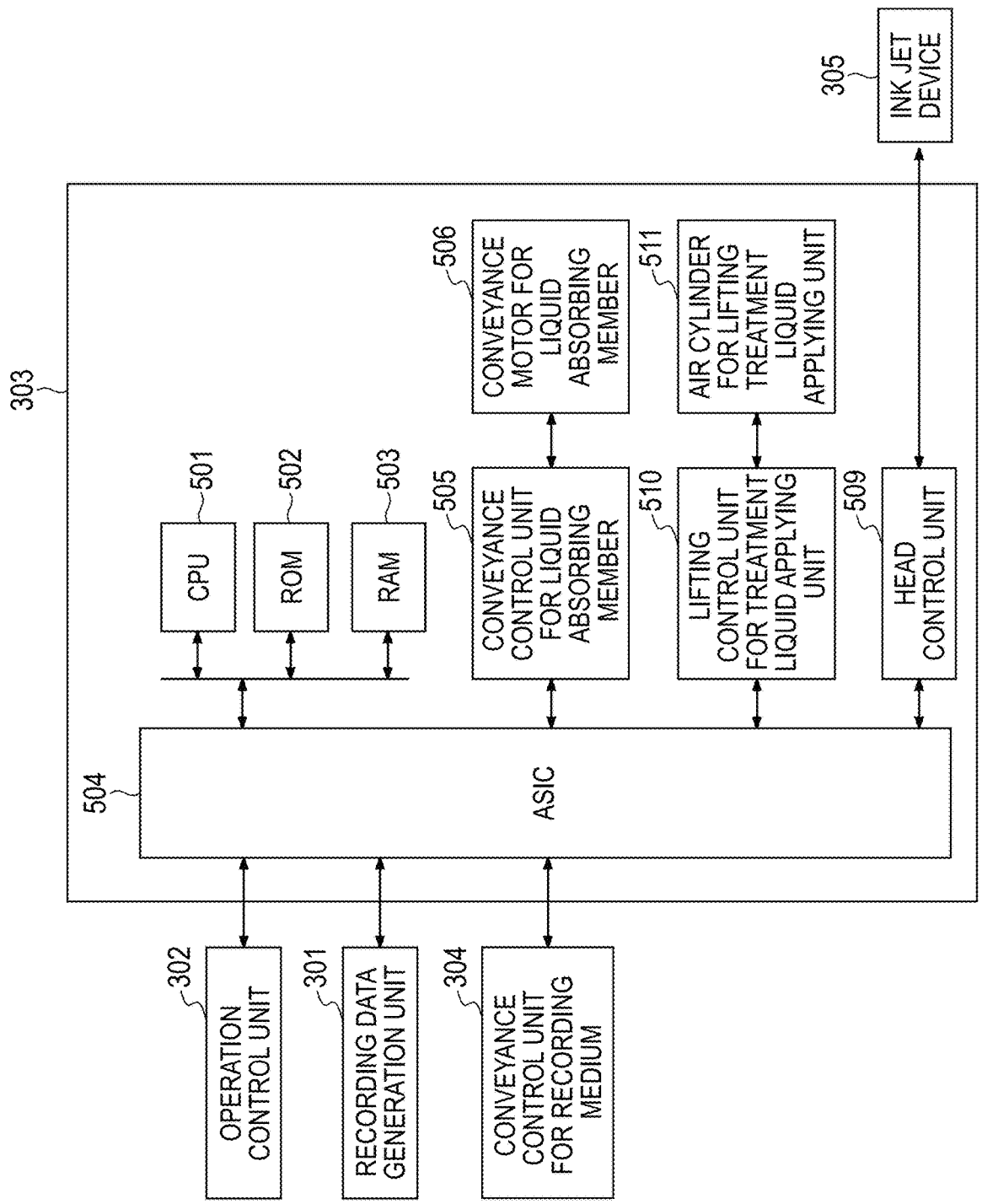
FIG. 8 is a block diagram of a printer control unit in the direct drawing type ink jet recording apparatus illustrated in FIG. 4.

FIG. 8 is a block diagram of the printer control unit in the direct drawing type ink jet recording apparatus in FIG. 4. The block diagram is equivalent to the block diagram of the printer control unit in the transfer type ink jet recording apparatus in FIG. 7 except that the driving control unit for transfer body 407 and the driving motor for transfer body 408 are not included. In other words, reference numeral 501 denotes a CPU which controls the entire printer, reference numeral 502 denotes a ROM for storing a control program of the CPU, and reference numeral 503 denotes a RAM for executing a program. Reference numeral 504 denotes an ASIC incorporating a network controller, a serial IF controller, a head data generating controller, a motor controller, and the like. Reference numeral 505 denotes a conveyance control unit for a liquid absorbing member for driving a conveyance motor for a liquid absorbing member 506, and is command-controlled by the ASIC 504 through a serial IF. Reference numeral 509 is a head control unit, and performs final discharge data generation for the ink jet device 305 and drive voltage generation, for example. Reference numeral 510 denotes a lifting control unit for a wetting liquid applying device for driving an air cylinder 511 for lifting the wetting liquid applying device, and is command-controlled by the ASIC 504 through the serial IF.

EXAMPLES

Hereinafter, the present invention will be described in more detail with reference to Examples and Comparative Examples. The present invention is not limited by Examples described below by any means without departing from the spirit of the present invention. In the description of Examples blow, the term "part" is based on mass unless otherwise described.

Example 1

In the present example, the transfer type ink jet recording apparatus illustrated in FIG. 3 was used.

In the present example, the transfer body 101 was fixed to a surface of the supporting member 102 using an adhesive. In the present example, a PET sheet of 0.5 mm in thickness coated with silicone rubber (KE12, manufactured by Shin-Etsu Chemical Co., Ltd.) at a thickness of 0.3 mm was used as an elastic layer of the transfer body J. In addition, a mixture of a condensate obtained by mixing glycidoxypropyl triethoxysilane and methyltriethoxysilane at a molar ratio of 1:1 and subjected to heat refluxing and a cationic photopolymerization initiator (SP150, manufactured by ADEKA Corporation) was prepared. An atmospheric pressure plasma treatment was performed in such a manner that the contact angle of water on the surface of the elastic layer was 10° or less. Thereafter, the mixture was applied onto the elastic layer to form a film with UV irradiation (with a high-pressure mercury lamp having a cumulative exposure of 5000 mJ/cm$^2$) and heat curing (at 150° C. for 2 hours), thereby producing the transfer body 101 in which a surface layer of 0.5 μm in thickness was formed on the elastic layer.

In this configuration, although not illustrated for simplicity of description, a double face tape was used to hold the transfer body 101 between the transfer body 101 and the supporting member 102. In this configuration, the surface of the transfer body 101 was kept at 60° C. by an unillustrated heating unit.

The ink applying device 204 used an ink jet head of such a type as to discharge an ink in an on-demand manner with an electrothermal converter, to form a solid image on the transfer body. The amount of the ink applied in the solid image formation was 20 g/m$^2$. The conveyance speed of the liquid absorbing member 105a was adjusted to a speed substantially equal to a travelling speed of the transfer body 101 by the conveyance rollers 105c, 105d, and 105e for the liquid absorbing member. To adjust the conveyance speed substantially equal to the travelling speed of the transfer body 101, the recording medium 108 was conveyed by the recording medium feeding roller 107a and the recording medium winding roller 107b. In the present example, the conveyance speed was 0.2 m/s. As the recording medium 108, Aurora Coat (manufactured by Nippon Paper Industries Co., Ltd. with a basis weight of 104 g/m$^2$) was used.

[Preparation of Reaction Liquid]

The reaction liquid to be applied by the reaction liquid applying device 103 had the following composition, and the amount of the reaction liquid applied by the reaction liquid applying device 103 was set to 1 g/m$^2$.

Glutaric acid: 21.0 mass %
Glycerin: 5.0 mass %
Surfactant F-444 (trade name, manufactured by DIC Corporation): 5.0 mass %
Ion-exchanged water: balance mass %

[Preparation of Ink]

The ink was prepared in the following manner.

<Preparation of Pigment Dispersion>

First, 10 parts of carbon black (trade name: MONARCH 1100, manufactured by Cabot Corporation), 15 parts of a resin aqueous solution (a solution of a styrene-ethyl acrylate-acrylic acid copolymer having an acid value of 150 and a weight average molecular weight (Mw) of 8,000, and a resin content of 20.0 mass % neutralized with a potassium hydroxide aqueous solution), and 75 parts of pure water were mixed. This mixture was fed in a batch type vertical sand mill (manufactured by AIMEX Co., Ltd.), and the mill was charged with 200 parts of zirconia beads having a diameter of 0.3 mm. The mixture was dispersed for 5 hours while being cooled with water. Then, this dispersion liquid was centrifugalized so that coarse particles were removed, and then, a black pigment dispersion having a pigment content of 10.0 mass % was obtained.

<Preparation of Resin Particle Dispersion>

First, 20 parts of ethyl methacrylate, 3 parts of 2,2'-azobis-(2-methylbutyronitrile), and 2 parts of n-hexadecane were mixed, and the mixture was stirred for 0.5 hours. This mixture was dropped to 75 parts of an 8 mass % aqueous solution of a styrene-butyl acrylate-acrylic acid copolymer (having an acid value of 130 mgKOH/g, a weight average molecular weight (Mw) of 7,000), followed by stirring for 0.5 hours. Then, the resulting mixture was subjected to supersonic wave irradiation for 3 hours with a supersonic wave irradiator. Subsequently, the mixture was subjected to a polymerization reaction for 4 hours in a nitrogen atmosphere at 80° C., followed by cooling to room temperature. The reaction product was then filtered to yield a resin particle dispersion with a resin content of 25.0 mass %.

<Preparation of Ink>

The resin particle dispersion obtained above and the pigment dispersion were mixed with the components below. The indication "balance" for ion-exchanged water refers to an amount with which the sum of all the components constituting the ink is 100.0 mass %.

Pigment dispersion (with a coloring material content of 10.0 mass %): 40.0 mass %

Resin fine particle dispersion: 20.0 mass %
Glycerine: 7.0 mass %
Polyethylene glycol (having a number-average molecular weight (Mn) of 1,000): 3.0 mass %
Surfactant Acetylenol E100 (trade name, manufactured by Kawaken Fine Chemicals Co., Ltd.): 0.5 mass %
Ion-exchanged water: balance These materials were sufficiently stirred to be dispersed, and then subjected to pressure filtration through a microfilter having a pore size of 3.0 μm (manufactured by Fujifilm Corporation), thereby preparing a black ink.

[Liquid Absorbing Member]

In the present embodiment, a porous body of PTFE (polytetrafluoroethylene) having an average pore diameter of 0.2 μm was used for the liquid absorbing member 105a. The contact angle for the surface (first surface) of the porous body of PTFE with water was 118°. This liquid absorbing member 105a had a Gurley value of 5 seconds, and the porous body had a thickness of 15 μm. Before the aqueous liquid component absorbed by the porous body came into contact with the first image again by contact of the liquid absorbing member 105a with the first image, at least part of the absorbed aqueous liquid component was removed from the porous body.

Before the liquid absorbing member 105a was brought into contact with the first image, the wetting liquid was applied to the liquid absorbing member 105a. This wetting liquid had the following composition, and the amount of application of the wetting liquid was set to 10 g/m².
Glycerin: 10.0 mass %
Surfactant (trade name: Megafac F-444, manufactured by DIC Corporation): 5.0 mass %
Ion-exchanged water: balance mass %

In the present example, a cloud point of the surfactant in the wetting liquid was measured as follows.

The wetting liquid of 50 ml was prepared. Then, the wetting liquid was heated from the room temperature, and the heating temperature when the wetting liquid was visually changed from transparent to translucent was regarded as a cloud point of the surfactant in the wetting liquid. The pressure was applied to the pressing member 105b so that an average pressure of the nip pressure between the transfer body 101 and the liquid absorbing member 105a is 39.2 N/cm² (4 kgf/cm²). The pressing member 105b used had a roller diameter of ϕ200 mm.

Example 2

Image formation and evaluation of the formed image were performed in a manner similar to that in Example 1 except that the fluorine-based surfactant Megafac F-444 (trade name, manufactured by DIC Corporation) was replaced by Capstone FS-3100 (trade name, manufactured by The Chemours Company LLC) as the surfactant contained in the wetting liquid.

Example 3

Image formation and evaluation of the formed image were performed in a manner similar to that in Example 1 except that the fluorine-based surfactant Megafac F-444 (trade name, manufactured by DIC Corporation) was replaced by a silicone-based surfactant BYK349 (trade name, manufactured by BYK Japan KK) as the surfactant contained in the wetting liquid.

Example 4

Image formation and evaluation of the formed image were performed in a manner similar to that in Example 1 except that the pressure applied in applying the wetting liquid was changed as indicated in Table 1. In Example 4, since the wetting liquid was applied by immersion under no pressure, a negligible slight smeared image occurred at the first use. After pressing contact between an image and the porous body, however, the porous body uniformly became wet with a liquid component of the ink so that such a smeared image was not observed after subsequent repetitive use.

Example 5

Image formation and evaluation of the formed image were performed in a manner similar to that in Example 4 except that the surfactant contained in the ink was changed from Acetylenol E100 (trade name, manufactured by Kawaken Fine Chemicals Co., Ltd.) to Megafac F444 (trade name, manufactured by DIC Corporation).

Example 6

Image formation and evaluation of the formed image were performed in a manner similar to that in Example 1 except that the temperature of the porous body was changed as indicated in Table 1.

Example 7

Image formation and evaluation of the formed image were performed in a manner similar to that in Example 2 except that the temperature of the porous body was changed as indicated in Table 1.

Example 8

Image formation and evaluation of the formed image were performed in a manner similar to that in Example 3 except that the temperature of the porous body was changed as indicated in Table 1.

Example 9

Image formation and evaluation of the formed image were performed in a manner similar to that in Example 1 except that a porous body of PTFE was immersed in Optool HD-1100TH (trade name, manufactured by DAIKIN INDUSTRIES, LTD) and was subjected to a surface treatment so that the contact angle of water with respect to a first surface of the porous body was reduced.

Example 10

Image formation and evaluation of the formed image were performed in a manner similar to that in Example 1 except that a porous body of PTFE was immersed in Optool DS-TH (trade name, manufactured by DAIKIN INDUSTRIES, LTD) and was subjected to a surface treatment so that the contact angle of water with respect to a first surface of the porous body was reduced.

Comparative Example 1

Image formation and evaluation of the formed image were performed in a manner similar to that in Example 1 except that no wetting liquid was applied to the porous body.

Comparative Example 2

The surfactant contained in the wetting liquid was changed from F-444 (trade name, manufactured by DIC Corporation) to Acetylenol E100 (trade name, manufactured by Kawaken Fine Chemicals Co., Ltd.) so that the contact angle of the wetting liquid with respect to a first surface of the porous body was adjusted to 900 or more. In the other aspects, image formation and evaluation of the formed image were performed in the same manner as that in Example 1.

Comparative Example 3

Image formation and evaluation of the formed image were performed in a manner similar to that in Comparative Example 2 except that the temperature of the porous body was changed as indicated in Table 1.

Comparative Example 4

Image formation and evaluation of the formed image were performed in a manner similar to that in Example 1 except that hydrophilic PTFE porous body obtained by performing a treatment on the PTFE porous body with polyvinyl alcohol (PVA) was used instead of the PTFE porous body.

Comparative Example 5

Image formation and evaluation of the formed image were performed in a manner similar to that in Example 1 except that hydrophilic PTFE porous body obtained by performing a treatment on the PTFE porous body with polyvinyl alcohol (PVA) was used instead of the PTFE porous body, and the wetting liquid was not applied.

[Evaluation]

Evaluations of the ink jet recording method in examples and comparative examples were conducted by the following evaluation methods. Table 1 shows evaluation results. Evaluation criteria AA to B are defined as preferred levels and criterion C is defined as an unacceptable level in evaluation items below.

<Adhesion of Coloring Material>

Evaluations of the adhesion of the coloring material in examples and comparative examples were conducted by the following procedures. First, a first surface of the porous body contained in the liquid absorbing member was brought into contact with an image (first image) formed on the transfer body 101. The first surface of the porous body was separated from the image. The adhesion condition of the coloring material to the surface (first surface) which was brought into contact with the image of the porous body after the first surface was separated from the image was evaluated based on criteria below. The first surface of the porous body preferably has little adhesion of the coloring material. The adhesion of the coloring material tended to decrease when the fluorinated resin as the first layer had smaller deformation, higher filtration performance, and smaller variation in the pressing force applied to the porous body by the pressing member 105b.

AA: No adhesion of the coloring material was observed after repetitive use (porous body was brought into contact with the image 10 times).

A: No adhesion of the coloring material was observed after a single use.

B: Slight adhesion of the coloring material was observed after a single use, but at a negligible level.

C: Much adhesion of the coloring material was observed after a single use.

<Smeared Image>

Evaluations of the smeared image in examples and comparative examples were conducted by the following procedures.

First, a first surface of the porous body contained in the liquid absorbing member was brought into contact with an image (first image) formed on the transfer body 101. The first surface of the porous body was separated from the image. The smeared image in the image (second image) remained on the transfer body 101 after the first surface was separated from the image was evaluated based on criteria below. The smeared image refers to a phenomenon that a coloring material in the image in an end portion thereof moves because of contact of the first surface of the porous body with the image. The amount of movement of the coloring material is preferably as small as possible because image quality increases as the amount of movement of the coloring material decreases.

A: No smeared image was observed after repetitive use (porous body was brought into contact with the image 10 times)

B: A slight smeared image was observed after repetitive use (porous body was pressed against the image 10 times), but at a negligible level.

C: A significant smeared image was observed after a single use.

TABLE 1

| | Porous body | Contact angle for first surface of porous body with water | Surfactant in wetting liquid | Cloud point of surfactant in wetting liquid | Contact angle for first surface of porous body with wetting liquid | Pressure to apply wetting liquid (kgf/cm2) | Temperature of porous body | Surfactant in ink | Smeared image | Adhesion of coloring material |
|---|---|---|---|---|---|---|---|---|---|---|
| Example 1 | PTFE | 118° | F-444 | 80° C. | 85° | 1 | 30° C. | Acetylenol E100 | A | AA |
| Example 2 | PTFE | 118° | FS3100 | 65° C. | 85° | 1 | 30° C. | Acetylenol E100 | A | AA |
| Example 3 | PTFE | 118° | BYK349 | 49° C. | 87° | 1 | 30° C. | Acetylenol E100 | A | AA |
| Example 4 | PTFE | 118° | F-444 | 80° C. | 85° | 0 | 30° C. | Acetylenol E100 | B | A |
| Example 5 | PTFE | 118° | F-444 | 80° C. | 85° | 0 | 30° C. | F-444 | A | A |
| Example 6 | PTFE | 118° | F-444 | 80° C. | 85° | 1 | 85° C. | Acetylenol E100 | B | A |
| Example 7 | PTFE | 118° | FS3100 | 65° C. | 85° | 1 | 70° C. | Acetylenol E100 | B | A |
| Example 8 | PTFE | 118° | BYK349 | 49° C. | 87° | 1 | 55° C. | Acetylenol E100 | B | A |

TABLE 1-continued

| | Porous body | Contact angle for first surface of porous body with water | Surfactant in wetting liquid | Cloud point of surfactant in wetting liquid | Contact angle for first surface of porous body with wetting liquid | Pressure to apply wetting liquid (kgf/cm2) | Temperature of porous body | Surfactant in ink | Smeared image | Adhesion of coloring material |
|---|---|---|---|---|---|---|---|---|---|---|
| Example 9 | PTFE (surface treatment) | 111° | F-444 | 80° C. | 83° | 1 | 30° C. | Acetylenol E100 | A | AA |
| Example 10 | PTFE (surface treatment) | 93° | F-444 | 80° C. | 81° | 1 | 30° C. | Acetylenol E100 | A | AA |
| Comparative Example 1 | PTFE | 118° | no treating liquid | | | | 30° C. | Acetylenol E100 | C | C |
| Comparative Example 2 | PTFE | 118° | Acetylenol E100 | 49° C. | 93° | 1 | 30° C. | Acetylenol E100 | C | C |
| Comparative Example 3 | PTFE | 118° | Acetylenol E100 | 49° C. | 93° | 1 | 55° C. | Acetylenol E100 | C | C |
| Comparative Example 4 | hydrophilic PTFE | 40° | F-444 | 80° C. | 38° | 1 | 30° C. | Acetylenol E100 | A | C |
| Comparative Example 5 | hydrophilic PTFE | 40° | no treating liquid | | | | 30° C. | Acetylenol E100 | A | C |

Example 11

Evaluation of the formed image was performed in a manner similar to that in Example 1 except that the direct drawing type ink jet recording apparatus illustrated in FIG. 4 which applies a reaction liquid directly onto a recording medium to further apply ink was used instead of the transfer type ink jet recording apparatus illustrated in FIG. 3. In image evaluation in the direct drawing type ink jet recording apparatus illustrated in FIG. 4, GLORIA PURE WHITE with a basis weight of 210 g/m² (manufactured by Gojo Paper Mgf. Co., Ltd.) was used as the recording medium. The reaction liquid composition, the reaction liquid applying device 203, the ink composition, the ink applying device 204, the conveyance speed of the recording medium, and the liquid absorbing device 205, except the recording medium, were similar to those of the transfer type ink jet recording apparatus used in Example 1. As a result, it was confirmed that the same evaluation results of the adhesion of the coloring material and the smeared image as those in Example 1 were observed.

According to the present invention, an ink jet recording apparatus and an ink jet recording method in which a porous body can be allowed to be in contact with an image to thereby remove a liquid component from the image and also suppress attachment of a coloring material constituting the image to the porous body can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink jet recording method comprising:
   an image forming step of forming a first image comprising an aqueous liquid component and a coloring material, by applying an ink comprising the coloring material and a reaction liquid that viscously thickens the ink onto an ink receiving medium;
   a liquid absorbing step of absorbing at least a part of the aqueous liquid component from the first image by bringing a first surface having water repellency of a porous body of a liquid absorbing member into contact with the first image on the ink receiving medium; and
   a wetting treatment step of performing a wetting treatment by applying a wetting liquid, whose contact angle to the first surface is less than 90°, to the first surface,
   wherein the liquid absorbing step is to bring the first surface wetted in the wetting treatment step into contact with the first image.

2. The ink jet recording method according to claim 1, wherein the ink comprises a resin fine particle aggregated by the reaction liquid.

3. The ink jet recording method according to claim 1, wherein the coloring material comprises a pigment.

4. The ink jet recording method according to claim 1, wherein the method comprises a step of applying the wetting liquid to the first surface in advance, before bringing the first surface into contact with the first image.

5. The ink jet recording method according to claim 1, wherein a contact angle of the aqueous liquid component in the first image to a first surface of the porous body is less than 90°.

6. The ink jet recording method according to claim 1, wherein the wetting liquid comprises water and a surfactant.

7. The ink jet recording method according to claim 6, wherein the surfactant is a silicone-based surfactant or a fluorine-based surfactant.

8. The ink jet recording method according to claim 5, wherein a temperature in contact with the first surface of the porous body with the first image is controlled to a temperature less than a cloud point of the surfactant.

9. The ink jet recording method according to claim 1, wherein a contact angle of water to the first surface of the porous body is 90° or more.

10. The ink jet recording method according to claim 1, wherein the porous body comprises a water repellent resin comprising polytetrafluoroethylene.

11. The ink jet recording method according to claim 1, wherein the ink receiving medium is a transfer body that temporarily holds the first image and a second image where at least a part of the aqueous liquid component is removed from the first image, and the method comprises a step of transferring the second image to a recording medium for formation of a final image.

12. The ink jet recording method according to claim 1, wherein the ink receiving medium is a recording medium for formation of a final image, and a second image where at least a part of the aqueous liquid component is removed from the first image is formed on the recording medium.

13. The ink jet recording method according to claim 1, wherein the image forming step comprises a step of applying the reaction liquid to the ink receiving medium and a step of applying the ink to the ink receiving medium in this order.

14. An ink jet recording method comprising:
an image forming step of forming a first image comprising an aqueous liquid component and a coloring material, by applying an ink comprising the coloring material and a reaction liquid that viscously thickens the ink onto an ink receiving medium;
a liquid absorbing step of concentrating an ink constituting the first image by bringing a first surface of a porous body having water repellency of a liquid absorbing member into contact with the first image on the ink receiving medium; and
a wetting treatment step of performing a wetting treatment by applying a wetting liquid, whose contact angle to the first surface is less than 90°, to the first surface,
wherein the liquid absorbing step is to bring the first surface wetted in the wetting treatment step into contact with the first image.

15. An ink jet recording apparatus comprising:
an image forming unit that forms a first image comprising an aqueous liquid component and a coloring material, by applying an ink comprising the coloring material and a reaction liquid that viscously thickens the ink onto an ink receiving medium;
a liquid absorbing member comprising a porous body having a first surface having water repellency, and absorbing at least a part of the aqueous liquid component from the first image by bringing the first surface into contact with the first image on the ink receiving medium; and
a wetting treatment unit that performs a wetting treatment by applying a wetting liquid, whose contact angle to the first surface is less than 90°, to the first surface.

16. The ink jet recording apparatus according to claim 15, wherein the ink comprises a resin fine particle aggregated by the reaction liquid.

17. The ink jet recording apparatus according to claim 15, wherein the coloring material comprises a pigment.

18. The ink jet recording apparatus according to claim 15, wherein the wetting treatment unit comprises a storage unit of the wetting liquid and a wetting liquid applying unit that applies the wetting liquid stored in the storage unit, to a first surface of the porous body.

19. The ink jet recording apparatus according to claim 15, wherein a contact angle of the aqueous liquid component in the first image to a first surface of the porous body is less than 90°.

20. The ink jet recording apparatus according to claim 15, wherein the wetting liquid comprises water and a surfactant.

21. The ink jet recording apparatus according to claim 20, wherein the surfactant is a silicone-based surfactant or a fluorine-based surfactant.

22. The ink jet recording apparatus according to claim 20, further comprising a temperature controller for controlling a temperature in contact with the first surface of the porous body with the first image to a temperature less than a cloud point of the surfactant.

23. The ink jet recording apparatus according to claim 15, wherein a contact angle of water to the first surface of the porous body is 90° or more.

24. The ink jet recording apparatus according to claim 23, wherein the porous body comprises a water repellent resin comprising polytetrafluoroethylene.

25. The ink jet recording apparatus according to claim 15, wherein the ink receiving medium is a transfer body that temporarily holds the first image and a second image where at least a part of the aqueous liquid component is removed from the first image, and the ink jet recording apparatus has a transfer unit that transfers a recording medium for formation of a final image, to the second image.

26. The ink jet recording apparatus according to claim 15, wherein the ink receiving medium is a recording medium for formation of a final image, and a second image where at least a part of the aqueous liquid component is removed from the first image by the liquid absorbing member is formed on the recording medium.

27. An ink jet recording apparatus comprising:
an image forming unit that forms a first image comprising an aqueous liquid component and a coloring material, by applying an ink comprising the coloring material and a reaction liquid that viscously thickens the ink, onto an ink receiving medium;
a liquid absorbing member comprising a porous body having a first surface having water repellency, and concentrating an ink constituting the first image by bringing the first surface into contact with the first image on the ink receiving medium; and
a wetting treatment unit that performs a wetting treatment by applying a wetting liquid, whose contact angle to the first surface is less than 90°, to the first surface.

* * * * *